United States Patent
Srinivasan et al.

(10) Patent No.: US 10,284,875 B2
(45) Date of Patent: May 7, 2019

(54) SYSTEMS AND METHODS FOR DETERMINING FEATURE POINT MOTION

(71) Applicant: QUALCOMM Incorporated, San Diego, CA (US)

(72) Inventors: Sujith Srinivasan, San Diego, CA (US); Gokce Dane, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/231,370

(22) Filed: Aug. 8, 2016

(65) Prior Publication Data
US 2018/0040133 A1    Feb. 8, 2018

(51) Int. Cl.
| | |
|---|---|
| H04N 19/56 | (2014.01) |
| H04N 19/43 | (2014.01) |
| H04N 19/533 | (2014.01) |
| H04N 19/54 | (2014.01) |
| G06T 7/246 | (2017.01) |

(52) U.S. Cl.
CPC ............ *H04N 19/56* (2014.11); *G06T 7/246* (2017.01); *H04N 19/43* (2014.11); *H04N 19/533* (2014.11); *H04N 19/54* (2014.11); *G06T 2207/10004* (2013.01)

(58) Field of Classification Search
USPC .............. 235/494; 348/208.4; 375/240.12, 375/240.16; 382/103
See application file for complete search history.

(56) References Cited

U.S. PATENT DOCUMENTS

| | | | | |
|---|---|---|---|---|
| 5,627,591 A | * | 5/1997 | Lee ........................ | H04N 19/54 348/699 |
| 5,638,129 A | * | 6/1997 | Lee ........................ | H04N 19/54 348/699 |
| 5,668,608 A | * | 9/1997 | Lee ........................ | H04N 5/145 235/494 |

(Continued)

FOREIGN PATENT DOCUMENTS

WO    2015044518 A1    4/2015

OTHER PUBLICATIONS

Wei, S. et al., "A novel motion estimation method based on normalized cross correlation for video compression," MMM'08 Proceedings of the 14th international conference on Advances in multimedia modeling, pp. 338-347, Jan. 2008.*

(Continued)

*Primary Examiner* — Xuemei G Chen
(74) *Attorney, Agent, or Firm* — Austin Rapp & Hardman, P.C.

(57) ABSTRACT

A method performed by an electronic device is described. The method includes obtaining a motion vector map based on at least two images. The motion vector map has fewer motion vectors than a number of pixels in each of the at least two images. The method also includes obtaining a feature point from one of the at least two images. The method further includes performing a matching operation between a template associated with the feature point and at least one search space based on the motion vector map. The method additionally includes determining a motion vector corresponding to the feature point based on the matching operation.

30 Claims, 10 Drawing Sheets

(56) References Cited

U.S. PATENT DOCUMENTS

| | | | |
|---|---|---|---|
| 6,020,925 A * | 2/2000 | Jung | H04N 19/54 348/699 |
| 7,986,810 B2 * | 7/2011 | Badawy | G06T 9/001 382/103 |
| 8,300,110 B2 * | 10/2012 | Hatanaka | H04N 5/217 348/208.13 |
| 8,660,182 B2 * | 2/2014 | Zhong | H04N 19/56 375/240.12 |
| 9,202,284 B2 * | 12/2015 | Akiyama | G06T 7/246 |
| 9,396,408 B2 * | 7/2016 | Reif | G06K 9/6202 |
| 9,413,962 B2 * | 8/2016 | Tsubaki | H04N 5/23277 |
| 9,584,824 B2 * | 2/2017 | Wang | H04N 19/56 |
| 9,706,121 B2 * | 7/2017 | Saito | H04N 5/23251 |
| 2002/0154695 A1 | 10/2002 | Cornog et al. | |
| 2003/0231712 A1 | 12/2003 | Malayath et al. | |
| 2005/0244081 A1 | 11/2005 | Zhou et al. | |
| 2005/0281335 A1 * | 12/2005 | Ha | H04N 19/56 375/240.16 |
| 2009/0034620 A1 * | 2/2009 | Okumura | H04N 19/53 375/240.16 |
| 2010/0142789 A1 | 6/2010 | Chang et al. | |
| 2012/0027091 A1 * | 2/2012 | Hsu | H04N 19/51 375/240.16 |
| 2012/0154579 A1 | 6/2012 | Hampapur et al. | |
| 2012/0294366 A1 * | 11/2012 | Eliyahu | H04N 19/533 375/240.16 |
| 2013/0170554 A1 * | 7/2013 | Matsuo | H04N 19/00587 375/240.16 |
| 2015/0030071 A1 * | 1/2015 | Heng | H04N 21/23439 375/240.16 |
| 2015/0131728 A1 | 5/2015 | Wang et al. | |
| 2016/0142727 A1 * | 5/2016 | Bernal | H04N 19/57 375/240.16 |
| 2016/0205323 A1 * | 7/2016 | Jiang | G06T 5/50 348/208.4 |
| 2016/0360081 A1 * | 12/2016 | Tsubaki | H04N 5/23264 |
| 2017/0094272 A1 * | 3/2017 | Rusanovskyy | H04N 19/523 |
| 2017/0180627 A1 * | 6/2017 | Paik | H04N 5/23254 |

OTHER PUBLICATIONS

Partial International Search Report—PCT/US20171035945—ISA/EPO—dated Jan. 23, 2018.

International Search Report and Written Opinion—PCT/US2017/035945—ISA/EPO—dated Oct. 26, 2017.

Mohanakrishnan J., et al., "A Novel Blink Detection System for User Monitoring", 1st IEEE Workshop on User-centered Computer Vision (UCCV), Jan. 15, 2013, pp. 37-42, XP032422458, DOI: 10.1109/UCCV.2013.6530806, ISBN: 978-1-4673-5675-6.

Tabatabai A.J., et al., "Motion Estimation Methods for Video Compression—A Review", Journal of the Franklin Institute, Pergamon Press, Elmsfor, NY, US, vol. 335, No. 8, Nov. 1998, pp. 1411-1441, XP027118902, ISSN: 0016-0032.

Inaba M., et al., "A Stereo Viewer Based on a Single Camera With View-Control Mechanisms", Proceedings of the 1993 IEIEE/RSJ International Conference on Intelligent Robots and Systems (IROS '93), Yokohama, Japan, Jul. 26-30, 1993, New York, NY, USA, IEEE, US, val. 3, Jul. 1993, pp. 1857-1865, XP01 0219214,DOI: 10.11 09/IROS.1993.583888, ISBN: 978-0-7803-0823-7.

International Search Report and Written Opinion—PCT/US2017/035945—ISA/EPO—dated Mar. 23, 2018.

Mombers F., et al., "A Video Signal Processor Core for Motion Estimation in MPEG2 Encoding", Proceedings of 1997 IEEE International Symposium on Circuits and Systems (ISCAS '97), Hong Kong Jun. 9-12, 1997, New York, NY USA, IEEE, US, vol. 4, Jun. 1997, pp. 2805-2808, XP010236312, DOI: 10.1109/ISCAS.1997.612908, ISBN: 978-0-7803-3583-7.

* cited by examiner

SYSTEMS AND METHODS FOR DETERMINING FEATURE POINT MOTION

FIELD OF DISCLOSURE

The present disclosure relates generally to electronic devices. More specifically, the present disclosure relates to systems and methods for determining feature point motion.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

It may be difficult to accurately detect changes in images. For example, it may be difficult to accurately detect a difference in object location between two images. As can be observed from this discussion, systems and methods that improve image processing may be beneficial.

SUMMARY

A method performed by an electronic device is described. The method includes obtaining a motion vector map based on at least two images. The motion vector map has fewer motion vectors than a number of pixels in each of the at least two images. The method also includes obtaining a feature point from one of the at least two images. The method further includes performing a matching operation between a template associated with the feature point and at least one search space based on the motion vector map. The method additionally includes determining a motion vector corresponding to the feature point based on the matching operation. The matching operation may be performed by a correlation engine and determining the motion vector may be performed by a processor that may be separate from the correlation engine. The method may include tracking an object based on the motion vector.

The method may include determining the template based on the feature point. The template may include a set of pixels including the feature point. The method may also include determining the at least one search space based on a location of the feature point and the motion vector map.

The motion vector map may be determined by video encoder hardware. The motion vector map may be determined based on a first type of correlation. The motion vector corresponding to the feature point may be determined based on a second type of correlation that is different from the first type of correlation.

The second type of correlation may be a more accurate and computationally intensive type of correlation than the first type of correlation. The first type of correlation may be a sum of absolution differences (SAD) and the second type of correlation may be a normalized cross correlation (NCC).

An electronic device is also described. The electronic device includes a motion engine configured to obtain a motion vector map based on at least two images. The motion vector map has fewer motion vectors than a number of pixels in each of the at least two images. The electronic device also includes a feature point obtainer configured to obtain a feature point from one of the at least two images. The electronic device further includes a matching engine configured to perform a matching operation between a template associated with the feature point and at least one search space based on the motion vector map. The electronic device additionally includes a feature point motion vector determiner configured to determine a motion vector corresponding to the feature point based on the matching operation.

An apparatus is also described. The apparatus includes means for obtaining a motion vector map based on at least two images. The motion vector map has fewer motion vectors than a number of pixels in each of the at least two images. The apparatus also includes means for obtaining a feature point from one of the at least two images. The apparatus further includes means for performing a matching operation between a template associated with the feature point and at least one search space based on the motion vector map. The apparatus additionally includes means for determining a motion vector corresponding to the feature point based on the matching operation.

A computer-program product is also described. The computer-program product includes a non-transitory computer-readable medium with instructions. The instructions include code for causing an electronic device to obtain a motion vector map based on at least two images. The motion vector map has fewer motion vectors than a number of pixels in each of the at least two images. The instructions also include code for causing the electronic device to obtain a feature point from one of the at least two images. The instructions further include code for causing the electronic device to perform a matching operation between a template associated with the feature point and at least one search space based on the motion vector map. The instructions additionally include code for causing the electronic device to determine a motion vector corresponding to the feature point based on the matching operation.

DETAILED DESCRIPTION

Figure 1:
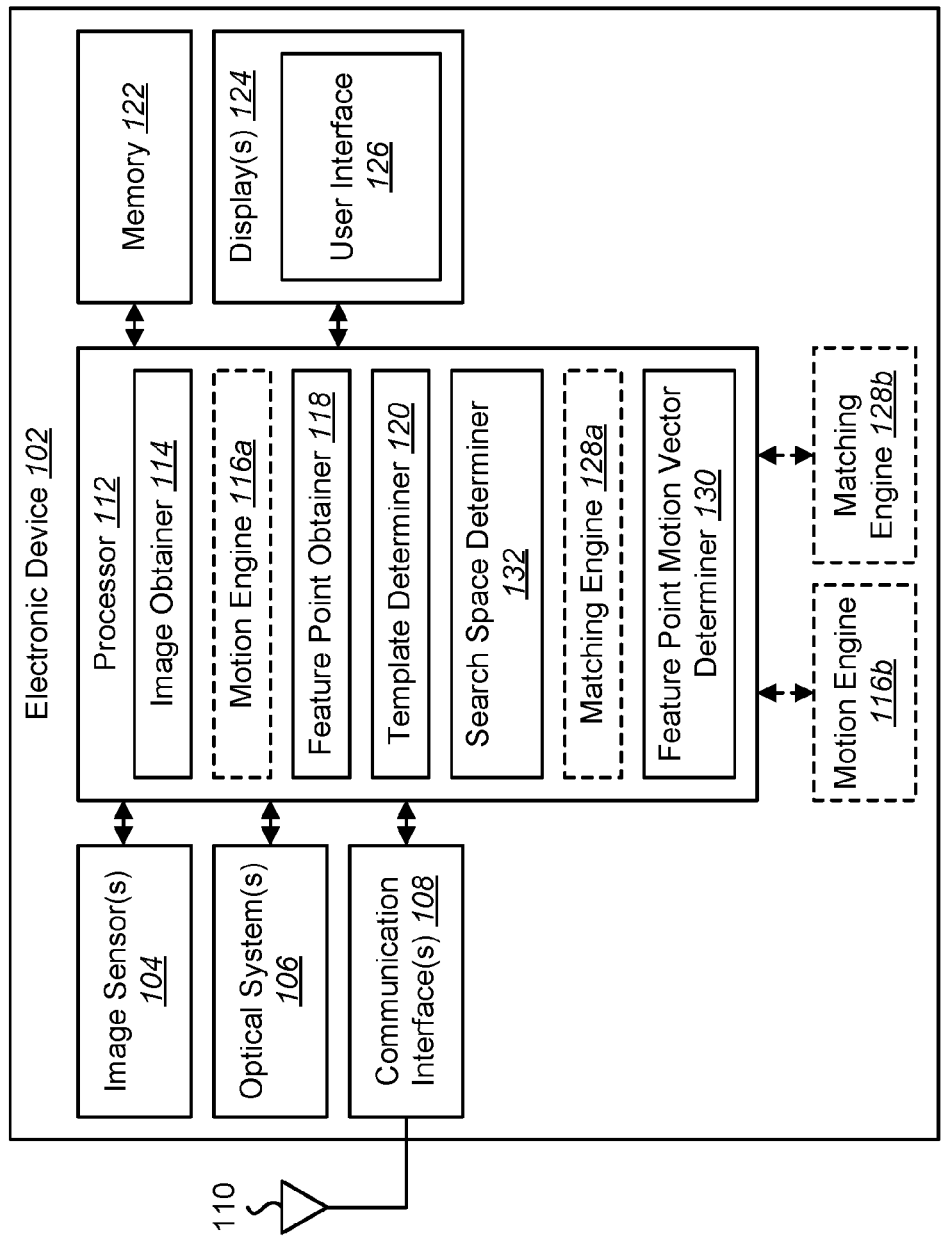
FIG. 1 is a block diagram illustrating one example of an electronic device in which systems and methods for determining feature point motion may be implemented.

Some configurations of the systems and methods disclosed herein may relate to generating reliable feature point motion from a semi-dense motion vector map. For example, the systems and methods disclosed herein may enable feature point-aligned motion vectors to be computed starting from a semi-dense motion vector map. Feature point-aligned motion may be utilized for computer vision tasks such as tracking. Semi-dense motion vectors on an evenly spaced grid may be easily (e.g., cheaply, quickly, and/or efficiently) computed and may be leveraged from video encoder cores in some approaches.

Some configurations of the systems and methods disclosed herein generate feature point motion vectors using a semi-dense motion vector map and a secondary matching engine (e.g., correlation engine). In some implementations, the systems and methods disclosed herein may leverage existing hardware (to determine the semi-dense motion vector map, for example) and may utilize a relatively small block and/or module to refine the motion vectors (for computer vision applications, for example). Some configurations of the systems and methods disclosed herein may utilize the motion vectors for object tracking, registration and/or matching. For example, the systems and methods disclosed herein may be implemented in mobile devices, connected cameras, vehicles, drones, computers, etc., with applications in entertainment, security, autonomous driving, assisted driving, navigation, etc.

Some configurations of the systems and methods disclosed herein may generate motion vectors (MVs) for one or more specific feature points based on a semi-dense motion vector map. The semi-dense motion vector map may or may not be evenly spaced. For example, the motion map may have grid dimensions such as 16×16-8×16-8×16, etc. A motion vector may be a pair of numbers that indicates the displacement (e.g., horizontal and vertical) of a pixel between two images. Feature points may be a set of points in an image that have activity and/or information around them. The activity may make these points easier to "track" (e.g., to find a motion vector). Corners and keypoints may be examples of feature points.

In some approaches, two or more images may be utilized. For example, two images may include previous and current frames (for motion tracking), stereoscopic (e.g., captured from different angles, left and right, up and down, different diagonal angles, etc.) images (for stereo matching, for example), or multiple images (for a panorama stitch, for example). Motion vectors may be calculated between two or more images. It should be noted that a motion vector may indicate a difference in location of a point between images. The point may or may not have actually moved. For example, two stereoscopic images may be captured at approximately the same time in some approaches. Accordingly, a motion vector may indicate a disparity or difference in location in images due to different perspectives. In another example, a camera may capture a series of images, where objects have moved between images, which may be indicated by one or more motion vectors. For instance, the motion of the one or more points may come as a result of the motion of an image sensor relative to its surroundings and/or as a result of the motion of an object relative to the image sensor. It should be noted that motion vectors may be computed in a forward sequence and/or in a backward sequence. For example, a motion vector may be generated for a point starting at a first (e.g., previous) frame and progressing to a second (e.g., current) frame. Additionally or alternatively, a motion vector may be generated for a point starting at the second (e.g., current) frame and progressing to a first (e.g., previous) frame.

A semi-dense motion vector map may be a set of motion vectors that is calculated on an evenly spaced semi-dense grid (e.g., 1 motion vector for every 16×16 or 8×8 pixels) or on a non-uniformly spaced semi-dense pattern. As used herein, the term "semi-dense" may indicate a subset and/or non-exhaustive coverage. For example, a semi-dense motion vector map may include a set of motion vectors that has fewer motion vectors than all points (e.g., pixels) in an image. In some approaches, a semi-dense motion vector map may include a number of motion vectors that is a fraction (or less than the fraction) of all possible points (e.g., pixels) in an image. For example, a semi-dense motion vector map may include motion vectors for $1/64$ or $1/256$ (or less) of all points in an image. Accordingly, a semi-dense motion vector map may not exhaustively correspond to all points in an image. Additionally or alternatively, a semi-dense motion vector map may only include motion vectors corresponding to a subset of points (e.g., pixels) in an image. Utilizing a semi-dense motion vector map may avoid some of the disadvantages of using a dense motion map. For example, while a dense motion map may offer good accuracy, computing a dense motion map may require a large die area, a large amount of computation, and/or may be inefficient (e.g., may discard a lot of information). A dense motion map may correspond to all points of an image in some configurations.

Computer vision use-cases may utilize motion vectors for specific feature points in every image. For example, the number of feature points may be between 5-25 thousand (K) points out of 2 million (M) points of a 1920×1080 image. Some approaches may calculate motion vectors using software running on a central processing unit (CPU) or digital signal processor (DSP). This may limit performance when the CPU or DSP needs to handle additional tasks concurrently.

Some configurations of the systems and methods disclosed herein may leverage a motion engine. For example, some encoder hardware (HW) (e.g., a video encoder with motion estimation (ME) hardware) may include a motion engine. Additionally or alternatively, some configurations may utilize a matching engine (e.g., correlation engine) to calculate feature aligned motion vectors. The motion vectors (provided by a motion engine, for example) may be semi-dense (e.g., available for each 8×8 block only, on an 8×8 grid, etc.). Some motion vectors may or may not indicate an accurate (e.g., the true) motion vector. For example, some motion vectors (e.g., motion vectors from an encoder and/or motion vectors determined using a less accurate approach) may be less accurate and/or may be more suitable for compression. In some implementations, the motions vectors in the semi-dense motion vector map may be calculated using a first type of correlation (e.g., a sum of absolute differences (SAD) correlation, which may be quick to compute but may offer less accuracy). For example, the motion vectors from the first type of correlation may be more suited for encoding and/or may not offer motion vectors that are aligned with feature points in some configurations. The above limitations may affect the accuracy of computer vision algorithms that use these motion vectors for tracking, matching, etc. It should be noted that obtaining feature point motion vectors (e.g., a feature point motion map) purely in software may restrict performance in some implementations.

In some configurations, a secondary matching engine (e.g., correlation engine) (in addition to the semi-dense motion vector map) may be utilized to assign motion vectors for one or more feature points (e.g., every feature point). The matching engine may utilize templates and search spaces (e.g., areas). A template may be a defined neighborhood around the feature point for which motion vector needs to be assigned. Templates may come from a first image or frame (e.g., previous, subsequent, left, or right image, etc.). For example, a template may be a set (e.g., window, neighborhood, etc.) of pixels that includes the location of the feature point. For instance, the template may include a range of pixels relative to the feature point location. In one example, the template may be an 8×8 window of pixels centered on the feature point location.

Obtaining search spaces may include finding an area (e.g., a block) of the semi-dense map that the feature point falls in. For example, motion vectors of a set of blocks (e.g., 9 motion vectors of the 3×3 surrounding blocks) may be obtained. The motion vectors may indicate candidate search areas. For each motion vector, the search area may be defined as a neighborhood of pixels in a second image or frame (e.g., current, previous, right, or left image, etc.) that are offset by a motion vector. For example, a feature point in a first image may be located at (100, 100) (with a corresponding template centered at (100, 100), for instance). In this example, a motion vector from the semi-dense motion vector map is (+5, −3). Then, the search space in a second image may be a neighborhood of pixels that is centered at (105, 97).

Matching (e.g., correlation matching) may be performed between the template and one or more search spaces. In some approaches, the correlation matching function may be a SAD (sum of absolute differences), a NCC (normalized cross correlation), etc. The matching engine (e.g., correlation engine) may return the match results for each template for one or more (e.g., all) corresponding search spaces. The best match may be assigned to the feature point as its corresponding motion vector. The best match may be indicated by a highest correlation value. In some configurations, additional heuristics may improve results by modifying the match criteria (e.g., best match criteria). In some implementations, the results of the matching engine (e.g., correlation engine) may also be post-processed using dedicated hardware and/or a programmable engine (such as a CPU and/or DSP, for example) for more flexibility. Apart from assigning a motion vector from the semi-dense map, some configurations of the systems and methods disclosed herein may refine the motion vector. In some approaches, larger search spaces may be utilized. Example sizes may include an 8×8 template and an 18×18 search space. This may refine a motion vector by up to +/−5 pixels, for example.

Some advantages of some configurations of the systems and methods disclosed herein are given as follows. Some configurations may provide a smaller alternative compared to a dedicated optical flow engine. For example, a hardware-based optical flow engine may have very "irregular" data patterns. A software-based optical flow may have performance limitations. Some configurations may provide a smaller alternative to a dense depth map, which is very costly. The solution may offer comparable performance to a dense depth map, which may be achieved as long as moving objects are not too small (so that the true motion vector is available in the surrounding blocks, for example). A semi-dense motion vector map may be provided by hardware (e.g., cores from a system-on-a-chip (SoC), video encoder, etc.). In some configurations, some chip area may be utilized for a secondary matching engine (e.g., correlation engine). This may leverage hardware (e.g., existing hardware). Some configurations of the systems and methods may not depend on the algorithm used by the encoder, so long as the semi-dense motion vectors are an adequate starting point. Some configurations may provide the ability to validate and/or refine a motion vector and/or use more robust matching criteria. The semi-dense motion vector map may be computed using SAD, while the matching engine (e.g., correlation engine) can use NCC, which may be more robust.

Some configurations of the systems and methods disclosed herein may include one or more of the following aspects. A motion vector corresponding to a feature point may be determined based on a semi-dense motion vector map. Determining the motion vector may be based on a matching operation (e.g., a normalized cross correlation (NCC)) between a template and at least one search space. At least one search space may be based on the feature point and the semi-dense motion vector map. Determining the motion vector may include validating and/or refining a motion vector based on the matching operation. Some configurations may include determining a computer vision motion vector based on a semi-dense motion vector map from video encoder hardware.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for determining feature point motion may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, appliances, etc. The electronic device 102 may include one or more components or elements. One or more of the components or elements may be implemented in hardware (e.g., circuitry) or a combination of hardware and software (e.g., a processor with instructions).

In some configurations, the electronic device 102 may perform one or more of the functions, procedures, methods, steps, etc., described in connection with one or more of FIGS. 1-10. Additionally or alternatively, the electronic device 102 may include one or more of the structures described in connection with one or more of FIGS. 1-10.

In some configurations, the electronic device 102 may include one or more processors 112, a memory 122, one or more displays 124, one or more image sensors 104, one or more optical systems 106, and/or one or more communication interfaces 108. The processor 112 may be coupled to (e.g., in electronic communication with) the memory 122, display 124, image sensor(s) 104, optical system(s) 106, and/or communication interface(s) 108. It should be noted that one or more of the elements of the electronic device 102 described in connection with FIG. 1 (e.g., image sensor(s) 104, optical system(s) 106, communication interface(s) 108, display(s) 124, etc.) may be optional and/or may not be included (e.g., implemented) in the electronic device 102 in some configurations.

The processor 112 may be a general-purpose single- or multi-chip microprocessor (e.g., an ARM), a special-purpose microprocessor (e.g., a digital signal processor (DSP)), a microcontroller, a programmable gate array, dedicated hardware, etc. The processor 112 may be referred to as a central processing unit (CPU). Although just a single processor 112 is shown in the electronic device 102, in an alternative configuration, a combination of processors (e.g., an image signal processor (ISP) and an application processor, an Advanced Reduced Instruction Set Computing (RISC) machine (ARM) and a digital signal processor (DSP), etc.) could be used. The processor 112 may be configured to implement one or more of the methods disclosed herein. The processor 112 may include and/or implement an image obtainer 114, a motion engine 116a, a feature point obtainer 118, a template determiner 120, a search space determiner 132, a matching engine 128a, and/or a feature point motion vector determiner 130 in some configurations.

It should be noted that in some configurations, the motion engine 116b may not be included in and/or implemented by the processor 112. For example, the motion engine 116b may be implemented separately (e.g., in a separate chip, separate circuitry, etc.) from the processor 112. Additionally or alternatively, it should be noted that in some configurations, the matching engine 128b may not be included in and/or implemented by the processor 112. For example, the matching engine 128b may be implemented separately (e.g., in a separate chip, separate circuitry, etc.) from the processor 112. When implemented separately, the motion engine 116b and/or the matching engine 128b may be in electronic communication with the processor 112 and/or memory 122 (and/or other elements). When a generic numeric label (e.g., 116 instead of 116a or 116b, or 128 instead of 128a or 128b) is used, this may be meant to refer to the element being implemented on the processor 112, separate from the processor 112, or a combination where corresponding functionality is implemented between both the processor 112 and a separate element.

The memory 122 may be any electronic component capable of storing electronic information. For example, the memory 122 may be implemented as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 122 may store instructions and/or data. The processor 112 may access (e.g., read from and/or write to) the memory 122. The instructions may be executable by the processor 112 to implement one or more of the methods described herein. Executing the instructions may involve the use of the data that is stored in the memory 122. When the processor 112 executes the instructions, various portions of the instructions may be loaded onto the processor 112 and/or various pieces of data may be loaded onto the processor 112. Examples of instructions and/or data that may be stored by the memory 122 may include image data, image obtainer 114 instructions, motion engine 116 instructions, feature point obtainer 118 instructions, template determiner 120 instructions, search space determiner 132 instructions, matching engine 128 instructions, and/or feature point motion vector determiner 130 instructions, etc.

The communication interface(s) 108 may enable the electronic device 102 to communicate with one or more other electronic devices. For example, the communication interface(s) 108 may provide one or more interfaces for wired and/or wireless communications. In some configurations, the communication interface(s) 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., image information, motion vector information, etc.) to and/or receive information from another device (e.g., a vehicle, a smart phone, a camera, a display, a remote server, etc.).

The electronic device 102 (e.g., image obtainer 114) may obtain one or more images (e.g., digital images, image frames, frames, video, etc.). For example, the electronic device 102 may include the image sensor(s) 104 and the optical system(s) 106 (e.g., lenses) that focus images of scene(s) and/or object(s) that are located within the field of view of the optical system 106 onto the image sensor 104. The optical system(s) 106 may be coupled to and/or controlled by the processor 112 in some configurations. A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, etc.).

Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.). In some configurations, the electronic device 102 may request and/or receive the one or more images via the communication interface 108. For example, the electronic device 102 may or may not include camera(s) (e.g., image sensor(s) 104 and/or optical system(s) 106) and may receive images from one or more remote device(s). One or more of the images (e.g., image frames) may include one or more scene(s) and/or one or more object(s).

In some configurations, the electronic device 102 may include an image data buffer (not shown). The image data buffer may be included in the memory 122 in some configurations. The image data buffer may buffer (e.g., store) image data from the image sensor(s) 104 and/or external camera(s). The buffered image data may be provided to the processor 112.

The display(s) 124 may be integrated into the electronic device 102 and/or may be coupled to the electronic device 102. Examples of the display(s) 124 include liquid crystal display (LCD) screens, light emitting display (LED) screens, organic light emitting display (OLED) screens, plasma screens, cathode ray tube (CRT) screens, etc. In some implementations, the electronic device 102 may be a smartphone with an integrated display. In another example, the electronic device 102 may be coupled to one or more remote displays 124 and/or to one or more remote devices that include one or more displays 124.

In some configurations, the electronic device 102 may include a camera software application. When the camera application is running, images of objects that are located within the field of view of the optical system(s) 106 may be captured by the image sensor(s) 104. The images that are being captured by the image sensor(s) 104 may be presented on the display 124. For example, one or more images may be sent to the display(s) 124 for viewing by a user. In some configurations, these images may be played back from the memory 122, which may include image data of an earlier captured scene. The one or more images obtained by the electronic device 102 may be one or more video frames and/or one or more still images. In some configurations, the display(s) 124 may present a full field of view of the image sensor(s) 104 and/or a zoom region. Additionally or alternatively, the display(s) 124 may present automatically focused images, one or more indicators corresponding to one or more objects of interest (e.g., ROIs) and/or one or more images (e.g., cropped object(s), zoomed object(s), etc.) resulting from one or more of the operations described herein.

In some configurations, the electronic device 102 may present a user interface 126 on the display 124. For example, the user interface 126 may enable a user to interact with the electronic device 102. In some configurations, the user interface 126 may enable a user to input a selected point and/or object. For example, the user interface 126 may receive a touch, a mouse click, a gesture, and/or some other indication that indicates a selected point and/or object. In some configurations, the display 124 may be a touch display (e.g., a touchscreen display). For example, a touch display may detect the location of a touch input. The location of a touch input may indicate the selected point and/or object.

The electronic device 102 (e.g., processor 112) may optionally be coupled to, be part of (e.g., be integrated into), include and/or implement one or more kinds of devices. For example, the electronic device 102 may be implemented in a drone or a vehicle equipped with cameras. In another example, the electronic device 102 (e.g., processor 112) may be implemented in an action camera.

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s).

In some configurations, the image obtainer 114 may request and/or receive one or more images (e.g., image frames, etc.). For example, the image obtainer 114 may request and/or receive one or more images from a remote device (e.g., external camera(s), remote server, remote electronic device, etc.) via the communication interface 108. The images obtained from the cameras may be utilized by the electronic device 102 to determine feature point motion.

The processor 112 may include and/or implement a motion engine 116a in some configurations. Additionally or alternatively, the motion engine 116b may be implemented separately from the processor 112. For example, the motion engine 116b may be implemented in a chip separate from the processor 112. In some configurations, the motion engine 116 may be implemented in a video encoder, where the video encoder may be implemented on the processor 112 or implemented separately (e.g., as separate video encoder hardware).

The motion engine 116 may obtain (e.g., determine and/or receive) a semi-dense motion vector map. The semi-dense motion vector map may be based on at least two images. In some configurations, the motion engine 116 may determine the semi-dense motion vector map based on two or more images. For example, the motion engine 116 may determine a set of motion vectors (of the semi-dense motion vector map) between two or more images. Each of the motion vectors may correspond to a point (e.g., pixel) or area (e.g., block, set of pixels, etc.) and may indicate the difference in location (e.g., "motion," "movement," etc.) of the point or area between two or more images. It should be noted that term "motion" may denote a difference in location between images (where a point or object may or may not have moved relative to the environment). As described above, the semi-dense motion vector map may include a set of motion vectors corresponding to areas (e.g., sets of pixels) and/or a subset of points of an image. The semi-dense motion vector map may be uniform or non-uniform. In some configurations, the semi-dense motion vector map may be arranged in a grid. Each element (e.g., block) of the grid may indicate the difference in location of a point (e.g., pixel) or area (e.g., block, set of pixels, etc.) between images. Each element of the grid may include or be associated with a single motion vector in some configurations.

The motion engine 116 may utilize one or more approaches to determine the semi-dense motion vector map. For example, the motion engine 116 may perform optical flow, a correlation (e.g., sum of absolute differences (SAD), normalized cross-correlation (NCC), phase correlation, etc.), a differential function, etc., to determine the semi-dense motion vector map (e.g., the set of motion vectors of the semi-dense motion vector map). In some cases and/or configurations, the motion vectors of the semi-dense motion vector map may not be based on a feature point. For example, the semi-dense motion vector map may be based on a predetermined pattern (e.g., grid) that is independent of a feature point. Accordingly, each motion vector of the semi-dense motion vector map may be determined independently of any feature point. Additionally or alternatively, the points of the motion vectors in the semi-dense motion vector map may not be located at the location of a feature point in some cases.

In some configurations, the motion engine 116 may receive the semi-dense motion vector map. For example, the semi-dense motion vector map may be provided to the motion engine 116. In some configurations, the motion engine 116 may receive the semi-dense motion vector map via the communication interface 108. For example, a remote device may determine the semi-dense motion vector map which may be sent to and received by the motion engine 116.

The processor 112 may include and/or implement a feature point obtainer 118. Alternatively, the feature point obtainer 118 may be implemented separately from the processor 112. For example, separate feature point obtainer hardware may be implemented that provides one or more feature points to the processor 112. The feature point obtainer 118 may obtain (e.g., determine and/or receive) one or more feature points based on (e.g., from) one or more images. For example, the feature point obtainer 118 may perform feature point detection (e.g., corner detection, keypoint detection). For instance, the feature point obtainer 118 may utilize one or more feature detection algorithms to detect one or more features. Examples of feature detection algorithms that may be utilized with the systems and methods disclosed herein may include a scale-invariant feature transform (SIFT), Harris corner detection, a features from accelerated segment test (FAST) corners algorithm, etc.

In some configurations, the feature point obtainer 118 may receive the one or more feature points from a remote device (via the communication interface(s) 108, for example). For instance, the feature point obtainer 118 may receive data from a remote device that indicates the feature point(s) of an image.

The processor 112 may include and/or implement a template determiner 120. The template determiner 120 may determine one or more templates based on one or more feature points. As described herein, a template may include a set of pixels (e.g., a block, area, region, window, etc.) relative to a feature point. For example, the feature point obtainer 118 may select a set of pixels relative to a feature point in an image. In some approaches, the template may be approximately centered on the feature point. For instance, the template determiner 120 may select a region of a particular size (e.g., a predetermined size, 8×8 pixels, 16×16 pixels, etc.) with the feature point located within the template (e.g., at the center of the template, at a corner of the template, at a pixel next to the center of the template, etc.).

In some configurations, the template determiner 120 may receive the one or more templates from a remote device (via the communication interface(s) 108, for example). For instance, the template determiner 120 may receive data from a remote device that indicates the template(s) of an image.

The processor 112 may include and/or implement a search space determiner 132. The search space determiner 132 may determine one or more search spaces based on one or more locations of one or more feature points and the semi-dense motion vector map. For example, the processor 112 may determine a search space (e.g., a search area, a set of pixels for search, etc.) based on a location of a feature point and one or more motion vectors of the semi-dense motion vector map. The search space(s) may be relative to a second image.

In some approaches, the search space determiner 132 may determine an area (e.g., block) of the semi-dense motion vector map in which the feature point is located. Additionally or alternatively, the search space determiner 132 may determine a starting point of a motion vector of the semi-dense motion vector map that is nearest to the feature point. In some approaches, the search space determiner 132 may determine one or more areas (e.g., blocks) and/or motion vector starting points relative to the area in which the feature point is located and/or relative to the nearest motion vector starting point. For example, the search space determiner 132 may determine locations (e.g., starting locations) of a 3×3 set of motion vectors, where the feature point is located within the center block corresponding to the center motion vector in the set.

The search space determiner 132 may determine one or more search spaces as one or more translations from the point(s) and/or area(s) corresponding to the one or more (determined or selected) motion vectors. For example, the search space determiner 132 may determine one or more search spaces (e.g., neighborhoods, sets of pixels, etc.) relative to the one or more end points of the (determined or selected) motion vector(s). For instance, assume that a feature point lies at (100, 100) in an image, which falls within a grid block having a motion vector of (+5, −3). A search area may be determined as a set of pixels (e.g., with dimensions 18×18) centered at (105, 97).

In some configurations, the search space determiner 132 may receive the one or more search spaces from a remote device (via the communication interface(s) 108, for example). For instance, the search space determiner 132 may receive data from a remote device that indicates the search space(s) of an image.

The processor 112 may include and/or implement a matching engine 128a in some configurations. Additionally or alternatively, the matching engine 128b may be implemented separately from the processor 112. For example, the matching engine 128b may be implemented in a chip separate from the processor 112 (e.g., in separate hardware).

The matching engine 128 may perform a matching operation between one or more templates (associated with one or more feature points, for example) and one or more search spaces (which may be based on the semi-dense motion vector map). For example, the matching engine 128 may perform one or more operations (e.g., correlations, sum of absolute differences (SAD), normalized cross-correlation (NCC), phase correlation, a differential function, histogram of oriented gradients (HoG), etc.). For instance, the matching engine 128 may use any matching algorithm to perform matching between two windows of pixels. In some approaches, HoG may be used to transform the two windows of pixels into feature vectors which may be matched. The matching engine 128 may produce matching results. The matching results may be a set of scores indicating a degree of matching between a template and a search space (and/or one or more positions of the template relative to the search space, for instance). In some examples, the matching results may correspond to each search space from a set of search spaces that correspond to the set of motion vectors selected by the search space determiner. Accordingly, each search space may have a corresponding matching score. It should be noted that the templates and search spaces may be the same size in some approaches. Additionally or alternatively, the matching engine 128 may shift the template over one or more search spaces in a sliding window fashion, producing a matching score for each position of the template relative to the search space(s). This may be performed in order to refine the motion vector. This may be performed in approaches where the search space size is larger than the template space, for example.

The processor 112 may include and/or implement a feature point motion vector determiner 130. The feature point motion vector determiner 130 may determine a motion vector corresponding to the feature point based on the matching operation. For example, the feature point motion vector determiner 130 may determine (e.g., select) a motion vector with a best (e.g., highest or lowest, depending on the approach) matching score.

In some approaches, the feature point motion vector determiner 130 may determine a motion vector selected from the semi-dense motion vector map. For example, a motion vector corresponding to a search space with a best matching score may be determined as the motion vector corresponding to the feature point.

In some approaches, the feature point motion vector determiner 130 may determine a motion vector between the feature point (in a first image) and the location of the best match (in the second image). For example, the motion vector may be determined as the translation between the feature point and the position of the best matching score (e.g., at the template shift position in a search space). This may be a "refined" motion vector (which may be different from one or more of the motion vectors in the semi-dense motion vector map). The motion vector(s) produced by the feature point motion vector determiner 130 may correspond to feature point(s).

The electronic device 102 (e.g., processor 112) may utilize the one or more motion vectors (e.g., feature point motion vectors) to perform one or more operations. Additionally or alternatively, the electronic device 102 (e.g., processor 112) may provide (e.g., send) the motion vector(s) to another component and/or another device.

Some configurations of the systems and methods disclosed herein may verify (and/or reject) a motion vector from the semi-dense motion vector map as a feature point motion vector. For example, the motion engine 116 may provide the semi-dense motion vector map and the search space determiner 132 may determine a set of motion vectors from the semi-dense motion vector map (that are near the feature point, for example) for verification and/or rejection. The matching engine 128 may then verify or reject each of the (determined) set of motion vectors. For example, the motion vector corresponding to the search space with a best (e.g., highest) matching score may be determined (e.g., verified) as an accurate motion vector corresponding to the feature point. For example, performing matching (e.g., a second correlation) may verify which of the set of motion vectors of the semi-dense motion vector map is the closest to the true motion vector for the feature point (even though the feature point may not be located exactly at the starting point of the verified semi-dense motion vector map motion vector, for example). Other motion vectors from the semi-dense motion vector map may be rejected.

In some approaches, the template and the search space(s) may be the same size and/or different sizes for verification. For example, in an approach where the template and the search spaces are the same size, the matching engine may indicate which of the search spaces is the best match based on a single matching score for each search space. In an approach where the one or more search spaces are larger than the template, the matching engine 128 may determine several matching scores for each search space corresponding to each relative position of the template within each search space. The search space that has the best (e.g., highest) matching score of all positions may be verified as the feature point motion vector. In other approaches, a search space with a best (e.g., highest) average matching score may indicate the search space with the verified motion vector. In some configurations, the matching criteria may be modified with additional heuristics for improved results. For example, sub-pixel interpolation may be performed on the results to provide a motion vector with fractional precision. Additionally or alternatively, different search areas may be combined into a combined larger search area.

Some configurations of the systems and methods disclosed herein may refine a motion vector from the semi-dense motion vector map as a feature point motion vector. For example, the motion engine 116 may provide the semi-dense motion vector map and the search space determiner 132 may determine a set of motion vectors from the semi-dense motion vector map (that are near the feature point, for example) for refinement. The matching engine 128 may then determine (e.g., refine) a motion vector based on the search space(s). For example, the motion vector corresponding to a position of the search space with a best (e.g., highest) matching score may be determined (e.g., refined) as an accurate motion vector corresponding to the feature point. For example, performing matching (e.g., a second correlation) may indicate a more accurate motion vector than a motion vector from the semi-dense motion vector map.

In some approaches for determining (e.g., refining) a motion vector, the template and the search space(s) may be different sizes. For example, in an approach where the one or more search spaces are larger than the template, the matching engine 128 may determine several matching scores for each search space corresponding to each relative position of the template within each search space. The position or location within a search space that has the best (e.g., highest) matching score of all positions may be utilized as an endpoint for a refined motion vector corresponding to a feature point.

In some configurations, the matching results from the matching engine 128 may be post-processed by the processor 112 or other dedicated hardware. Examples of post processing may include sub-pixel interpolation of the correlation surface to get fractionally accurate motion vectors (e.g., (5.25, −7.75) instead of (5, −8)).

In some configurations, the electronic device 102 may generate a region of interest (ROI) (e.g., bounding box) based on the one or more motion vector(s). For example, the electronic device 102 may generate an ROI that includes all or a portion of one or more motion vectors corresponding one or more feature points. In some approaches, the electronic device 102 may generate the ROI to tightly bound the ending points of the one or more motion vectors. In some configurations, the electronic device 102 may present the ROI on a display (e.g., show an outline of the ROI, highlight the ROI, color the ROI, show text on and/or near the ROI, show an icon on and/or near the ROI, etc.). In some configurations, the ROI may bound an object that corresponds to the feature points.

The motion vector(s) and/or an ROI (based on the motion vector(s)) may be utilized to perform one or more operations in some configurations. For example, the electronic device 102 may perform object tracking, image modification (e.g., object removal, object cloning, etc.), object recognition, object detection, autofocus, automatic zoom, autonomous driving, assisted driving, navigation, etc., based on the motion vector(s) and/or the ROI. Utilizing the motion vector(s) and/or the ROI to perform one or more of these operations may improve the performance (e.g., accuracy, speed, and/or efficiency) of the operation(s).

It should be noted that one or more of the elements or components of the electronic device 102 may be combined and/or divided. For example, one or more of the image obtainer 114, the motion engine 116, the feature point obtainer 118, the template determiner 120, the search space determiner 132, the matching engine 128, and/or the feature point motion vector determiner 130 may be combined. Additionally or alternatively, one or more of the image obtainer 114, the motion engine 116, the feature point obtainer 118, the template determiner 120, the search space determiner 132, the matching engine 128, and/or the feature point motion vector determiner 130 may be divided into elements or components that perform a subset of the operations thereof.

Figure 2:
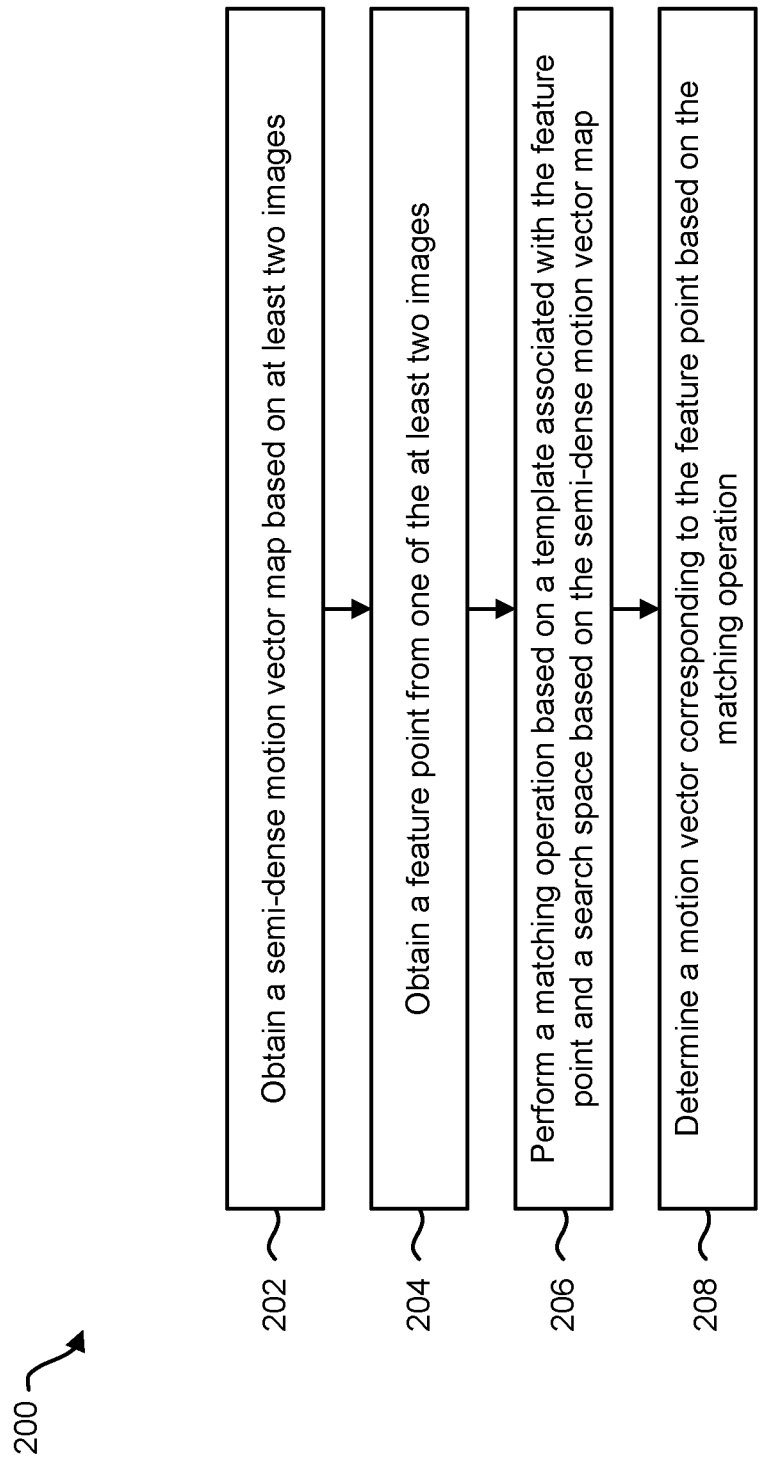
FIG. 2 is a flow diagram illustrating one configuration of a method for determining feature point motion.

FIG. 2 is a flow diagram illustrating one configuration of a method 200 for determining feature point motion. The method 200 may be performed by an electronic device (e.g., the electronic device 102 described in connection with FIG. 1).

The electronic device 102 may obtain 202 a semi-dense motion vector map based on at least two images. This may be accomplished as described in connection with FIG. 1. For example, the electronic device 102 may determine the semi-dense motion vector map (using a motion engine 116, for example) and/or may receive the semi-dense motion vector map from one or more remote devices. In some configurations, the semi-dense motion vector map may be determined by a motion engine 116b in video encoder hardware (which may provide the semi-dense motion vector map to the processor 112, for example).

The electronic device 102 may obtain 204 a feature point from one of the at least two images (e.g., from a first image). This may be accomplished as described in connection with FIG. 1. For example, the electronic device 102 may determine and/or receive the feature point from a remote device. For instance, the electronic device 102 may perform feature detection (e.g., corner detection, keypoint detection, etc.) based on an image.

The electronic device 102 may perform 206 a matching operation based on a template associated with the feature point and a search space based on the semi-dense motion vector map. This may be accomplished as described in connection with FIG. 1. For example, the electronic device 102 may perform one or more operations (e.g., correlations, SADs, NCCs, phase correlation, differential function(s), etc.) with the template and one or more corresponding search spaces. For instance, the electronic device 102 may compute a correlation between the template and each of the one or more search spaces to determine matching results (e.g., matching scores).

The electronic device 102 may determine 208 a motion vector corresponding to the feature point based on the matching operation. This may be accomplished as described in connection with FIG. 1. For example, the electronic device 102 may determine a motion vector corresponding to a search space with a best matching score as the motion vector corresponding to a feature point. Additionally or alternatively, the electronic device 102 may determine a motion vector corresponding to a location in a search space with a best matching score. It should be noted that the method 200 may be performed for multiple feature points (e.g., for a set of feature points). For example, one or more of the functions and/or steps 202, 204, 206, 208 may be performed for a set of feature points.

In some configurations, the electronic device 102 may perform one or more operations based on the motion vector(s). This may be accomplished as described in connection with FIG. 1. For example, the electronic device 102 may generate an ROI, perform object tracking, perform image modification, perform object recognition, perform object detection, perform automatic zoom, perform navigation, perform autonomous driving, and/or perform assisted driving, etc., in some configurations.

In one example, the electronic device 102 may generate an ROI based on the motion vector(s). For example, the one or more feature points may correspond to an object (e.g., a detected object). The electronic device 102 may generate an ROI to bound the feature points. For example, the motion vector(s) may indicate the difference in location (e.g., motion) of the object between images (e.g., frames). One or more ending points of the motion vectors may indicate the location of feature point(s) in a second image. Accordingly, the electronic device 102 may generate an ROI (e.g., bounding box) to enclose the endpoints of the motion vectors (e.g., updated feature points). This may indicate the location of an object. The ROI may be utilized to perform one or more functions (e.g., autofocus, object recognition (e.g., facial recognition, character recognition, etc.), automatic zoom, image registration, autonomous driving, assisted driving, navigation, etc.). It should be noted that the electronic device 102 may alternatively perform one or more functions without generating an ROI in some configurations.

In some configurations, the electronic device 102 may perform autofocus based on the motion vector(s). For example, the electronic device 102 may utilize data from the endpoints of the motion vector(s) (e.g., the updated feature points, one or more regions including the updated feature point(s), etc.) to focus an optical system. For instance, the electronic device 102 may utilize a sensor mechanism (e.g., infrared, time-of-flight, stereoscopic image triangulation, etc.) to determine a depth of an object based on the motion vectors. The electronic device 102 may then adjust an optical system to focus at the depth of the object. In some configurations, the motion vectors may indicate the locations of the same object in two (e.g., stereoscopic) images. This may enable the electronic device 102 to determine a disparity between the two images and determine a depth for autofocus.

In some configurations, the electronic device 102 may utilize the motion vectors for performing object recognition. For instance, the electronic device 102 may utilize the updated feature points and/or a region including the updated feature points for recognizing a corresponding object in an image (e.g., a second image). In some approaches, the electronic device 102 may utilize the updated feature points to determine a feature vector, which may be compared to one or more predetermined feature vectors in a database to recognize an object. In some approaches, the electronic device 102 may utilize a region including the updated feature points and match (e.g., correlate) the region with one or more entries is a database to recognize the object.

In some configurations, the electronic device 102 may utilize the motion vectors for performing automatic zoom. For instance, the electronic device 102 may utilize the updated feature points and/or a region including the updated feature points for controlling zooming for an object in an image (e.g., a second image). In some approaches, the electronic device 102 may utilize the updated feature points to determine zoom to an area that includes the updated features points (e.g., an object).

In some configurations, the electronic device 102 may perform image registration (e.g., alignment) and/or image stitching based on the motion vector(s). For example, the electronic device 102 may utilize data from the endpoints of the motion vector(s) (e.g., the updated feature points, one or more regions including the updated feature point(s), etc.) to align images. In some configurations, the motion vectors may indicate the locations of the same object in two images (e.g., stereoscopic images, two images taken at different times from different perspectives, etc.). This may enable the electronic device 102 to determine a transformation between the two images. The electronic device 102 may utilize the transformation to align the images and/or to stitch the images. In some approaches, the electronic device 102 may crop overlapping areas.

In some configurations, the electronic device 102 may utilize the motion vectors for performing object tracking. For instance, the electronic device 102 may utilize the updated feature points and/or a region including the updated feature points to track a corresponding object in an image (e.g., a second image). For example, the motion vector(s) and/or updated feature point(s) may indicate the movement of an object between images (e.g., in a series of frames). Accordingly, the electronic device 102 may track an object by determining its updated location based on the motion vector(s) and/or updated feature point(s).

In some configurations, the electronic device 102 may utilize the motion vectors for performing navigation. For instance, the electronic device 102 may utilize the updated feature points and/or a region including the updated feature points to determine the location of an object and/or to avoid colliding with the object. For example, the motion vector(s) and/or updated feature point(s) may indicate the relative motion between an object in a scene and an electronic device (e.g., a drone, a robot, a vehicle, an aircraft, etc.). Accordingly, the electronic device 102 (e.g., drone, robot, vehicle, aircraft, etc.) may control movement (e.g., wheel motion, steering, drive train, braking, crawler tracks, rotors, thrust, etc.) to navigate around one or more objects (e.g., obstructions) and/or to avoid colliding with an object (e.g., obstruction).

In some configurations, the electronic device 102 may utilize the motion vectors for performing autonomous and/or assisted driving. For instance, the electronic device 102 may utilize the updated feature points and/or a region including the updated feature points to determine the location of an object and/or to avoid colliding with the object. For example, the motion vector(s) and/or updated feature point(s) may indicate the relative motion between an object in a scene and an electronic device (e.g., a vehicle). Accordingly, the electronic device 102 may control movement (e.g., wheel motion, steering, drive train, braking, etc.) to navigate around one or more objects (e.g., obstructions) and/or to avoid colliding with an object (e.g., obstruction). For instance, a vehicle may autonomously drive while avoiding colliding with objects (e.g., pedestrians, other vehicles, debris, etc.) indicated by the motion vector(s). In another example, a vehicle may assist a driver of a vehicle by initiating emergency braking and/or maneuvers to avoid a collision and/or to reduce collision impact.

Figure 3:
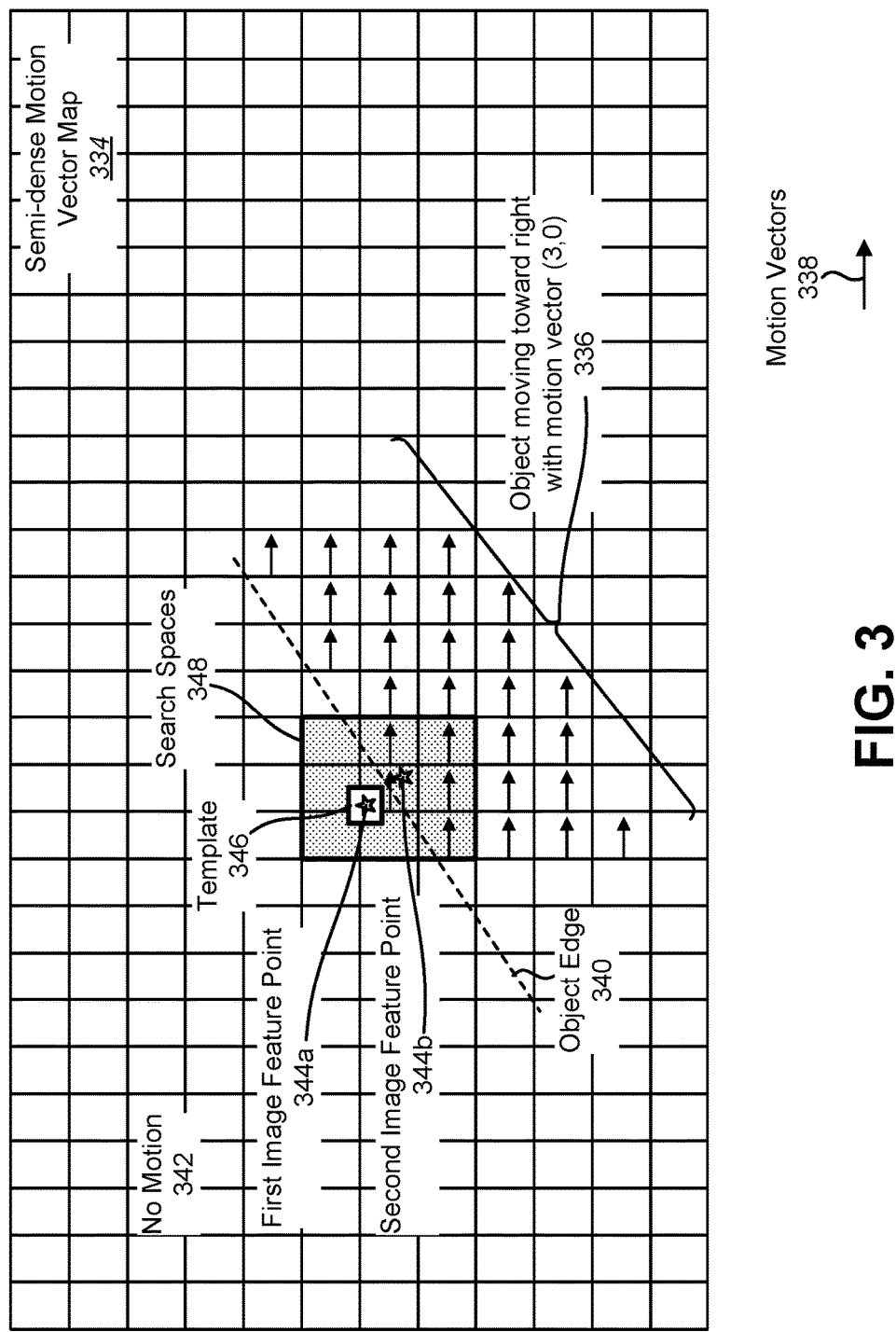
FIG. 3 illustrates an example of determining feature point motion in accordance with some configurations of the systems and methods disclosed herein.

FIG. 3 illustrates an example of determining feature point motion in accordance with some configurations of the systems and methods disclosed herein. In particular, FIG. 3 illustrates a semi-dense motion vector map 334 (e.g., a grid). The semi-dense motion vector map 334 includes a set of motion vectors 338. The set of motion vectors 338 indicates an object moving toward the right 336 with several (3, 0) motion vectors. Other areas of the semi-dense motion vector map 334 indicate no motion 342 (e.g., no motion vector).

As illustrated in FIG. 3, a first image feature point 344a (e.g., a feature point from a first image) is illustrated relative to the semi-dense motion vector map 334. In this example, the first image feature point 344a is near an object edge 340. A second image feature point 344b (e.g., a feature point from a second image) is also illustrated relative to the semi-dense motion vector map 334. One problem addressed by the systems and methods disclosed herein is how to assign a motion vector for a feature point. As illustrated in this example, simply taking the nearest motion vector may be incorrect and/or inaccurate.

In accordance with some configurations of the systems and methods disclosed herein, a template 346 may be defined around the first image feature point 344a. In particular, the template 346 may include a set of pixels in the first image that includes the first image feature point 344a. Search spaces 348 may also be defined based on motion vectors corresponding to blocks around the first image feature point 344a. In this example, 9 candidate search areas are defined by the motion vectors of 3×3 blocks (e.g., surrounding blocks). More specifically, search spaces may be defined based on 4 blocks with (0, 0) motion vectors and 5 blocks with (3, 0) motion vectors. In some configurations, the motion vectors may be expressed in terms of pixels. In the example in FIG. 3, the (0, 0) and (3, 0) translations in terms of pixels correspond to the search spaces 348 illustrated. In some configurations, a correlation may be performed using the template 346 defined around the first image feature point 344a and the search spaces 348 (e.g., motion vectors used as search areas). The best matching search space (e.g., motion vector) may be assigned to the feature point 344. In some configurations, the best matching location within the search space may be determined as the motion vector for the feature point 344. This may refine the motion vector and/or improve accuracy of the motion vector corresponding to the feature point 344.

Figure 4:
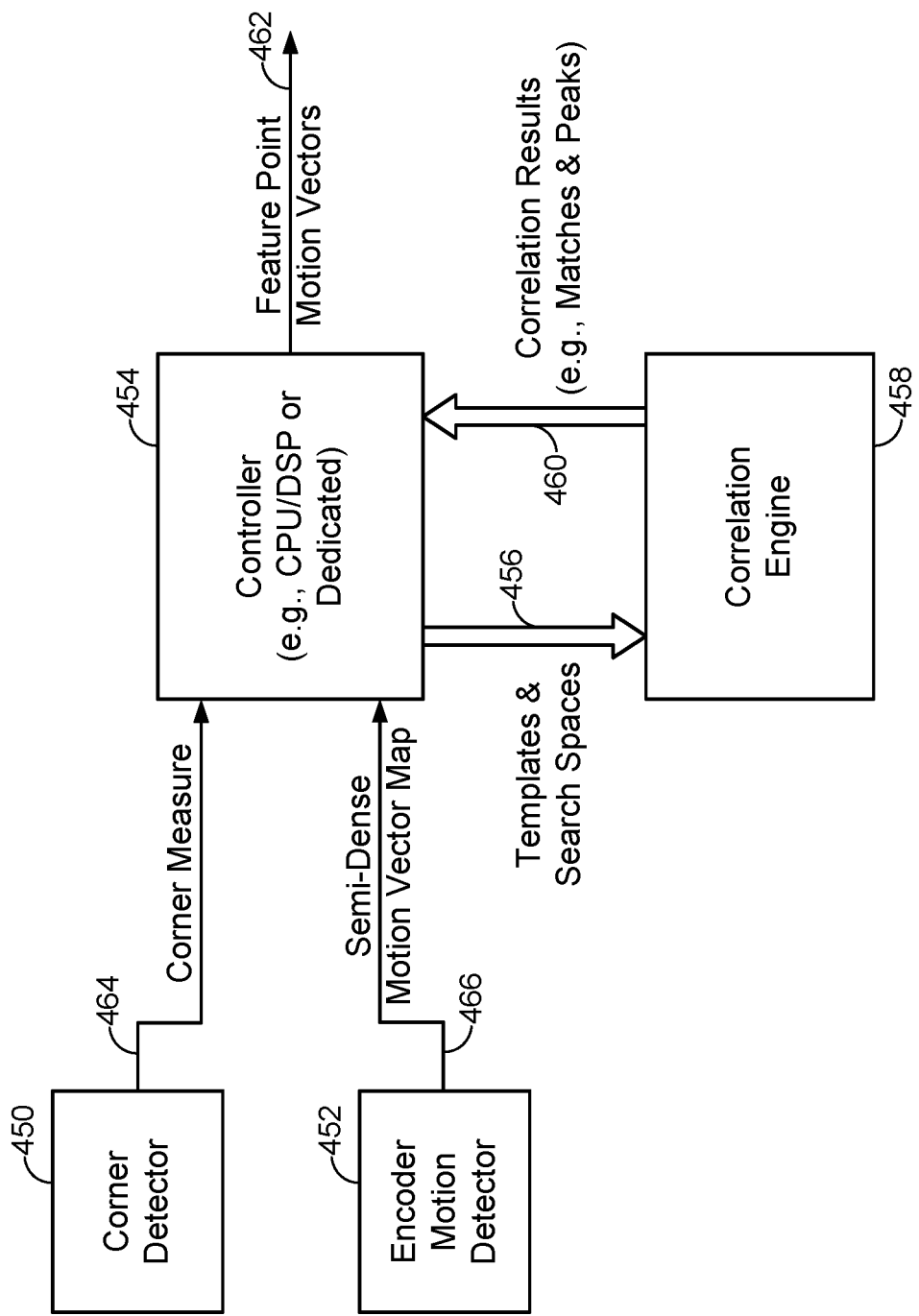
FIG. 4 is a block diagram illustrating one example of an implementation of the systems and methods disclosed herein.

FIG. 4 is a block diagram illustrating one example of an implementation of the systems and methods disclosed herein. In particular, FIG. 4 illustrates a corner detector 450, an encoder motion detector 452, a controller 454, and a correlation engine 458. It should be noted that the corner detector 450, the encoder motion detector 452, the controller 454, and/or the correlation engine 458 may be implemented on a general purpose processor (e.g., CPU, DSP, etc.) and/or may be implemented in application specific hardware.

The corner detector 450 may detect one or more corners (e.g., feature points) in an image. For example, the corner detector 450 may provide a corner measure 464 to the controller 454 that indicates one or more corners (e.g., feature points, locations of feature points, etc.). The corner detector 450 may be one example of the feature point obtainer 118 described in connection with FIG. 1.

The encoder motion detector 452 may determine a set of motion vectors (e.g., a semi-dense motion vector map 466) from two or more images. For example, the encoder motion detector 452 may provide the semi-dense motion vector map 466 to the controller 454 that indicates a set of motion vectors. In some configurations, the encoder motion detector 452 may perform a correlation operation (e.g., SAD) to determine the semi-dense motion vector map 466. The encoder motion detector 452 may be one example of the motion engine 116 described in connection with FIG. 1.

The controller 454 may determine templates and search spaces 456 based on the corner measure 464 and the semi-dense motion vector map 466. For example, the controller 454 may determine the templates based on the corners (e.g., feature points). The controller 454 may determine the search spaces based on the corner measure 464 and the semi-dense motion vector map 466. The controller 454 may provide the templates and search spaces 456 to the correlation engine 458. The controller 454 may be one example of the processor 112 (e.g., CPU, DSP, and/or dedicated hardware) described in connection with FIG. 1.

The correlation engine 458 may determine correlation results 460 (e.g., matching results, peaks, scores, etc.) based on the templates and search spaces 456. For example, the correlation engine 458 may determine the correlation results by performing a correlation operation between the templates and the search spaces. The correlation engine 458 may provide the correlation results 460 to the controller 454. The correlation engine 458 may be one example of the matching engine 128 described in connection with FIG. 1.

The controller 454 may determine feature point motion vectors 462 based on the correlation results 460. For example, the controller 454 may determine a search space and/or a location with a best correlation result (e.g., matching result). The controller 454 may utilize the feature point motion vectors 462 for one or more operations and/or may provide the feature point motion vectors 462 to another component and/or device.

Figure 5:
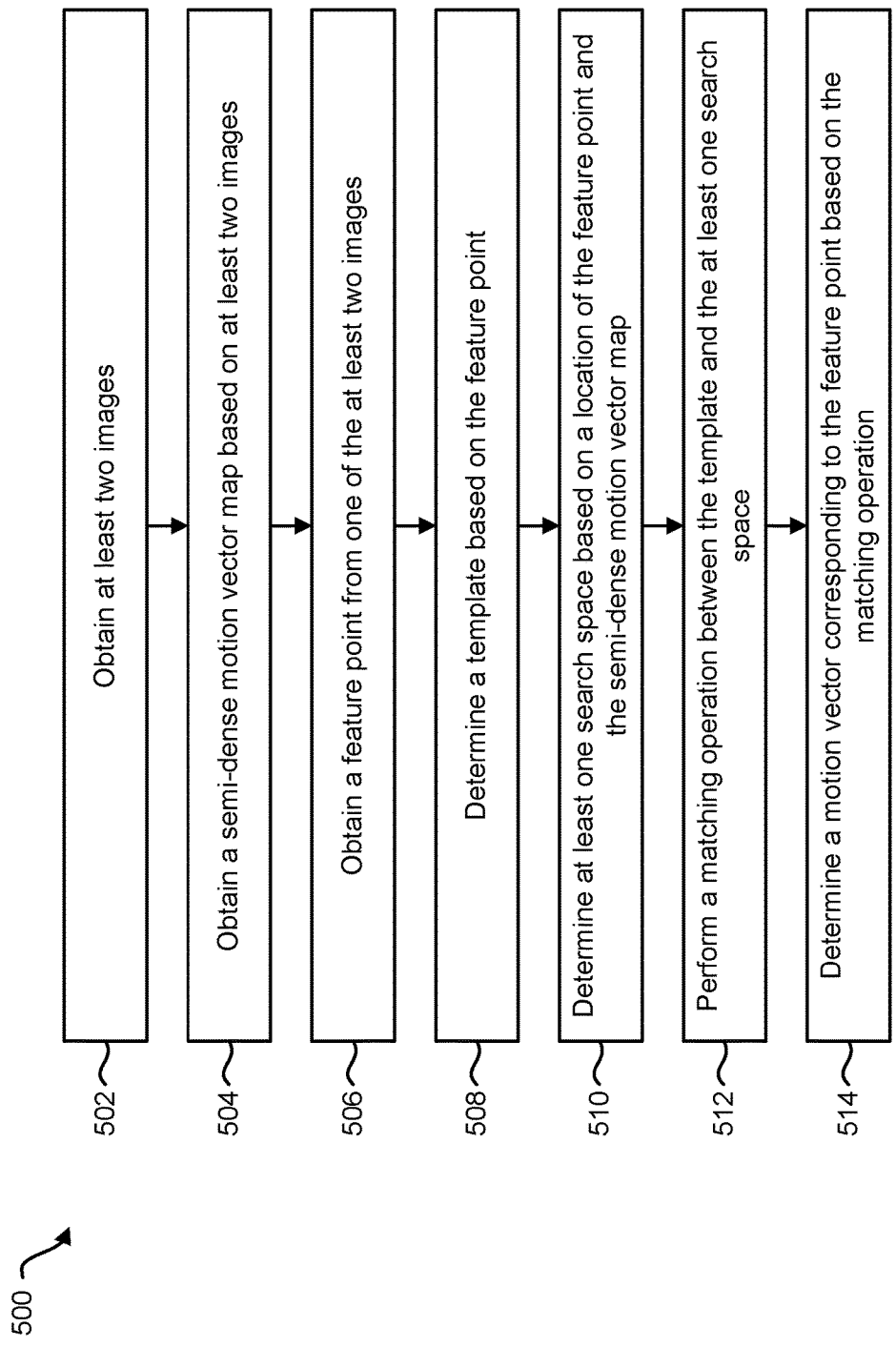
FIG. 5 is a flow diagram illustrating a more specific configuration of a method for determining feature point motion.

FIG. 5 is a flow diagram illustrating a more specific configuration of a method 500 for determining feature point motion. The method 500 may be performed by an electronic device (e.g., the electronic device 102 described in connection with FIG. 1) and/or one or more of the components described in connection with FIG. 4.

The electronic device 102 may obtain 502 at least two images. This may be accomplished as described in connection with FIG. 1. For example, the electronic device 102 may capture images with one or more image sensors 104 and/or may receive images from one or more remote devices. The image(s) may include one or more scenes comprising one or more objects.

The electronic device 102 may optionally present one or more of the images. For example, the electronic device 102 may present the images on display(s) and/or may provide the image(s) to one or more display(s) for presentation. This may allow a user to view the image(s).

The electronic device 102 may obtain 504 a semi-dense motion vector map based on at least two images. This may be accomplished as described in connection with one or more of FIGS. 1-4.

The electronic device 102 may obtain 506 a feature point from one of the at least two images (e.g., from a first image). This may be accomplished as described in connection with one or more of FIGS. 1-4.

The electronic device 102 may determine 508 a template based on the feature point. This may be accomplished as described in connection with one or more of FIGS. 1-4. For example, the electronic device 102 may determine 508 one or more templates based on one or more feature points. Determining 508 a template may include selecting a set of pixels relative to a feature point in an image. For example, the template may include a set of pixels within region (e.g., a uniform region, non-uniform region, symmetrical region, asymmetrical region, box, square, rectangle, circle, ellipse, polygon, etc.).

The electronic device 102 may determine 510 at least one search space based on a location of the feature point and the semi-dense motion vector map. This may be accomplished as described in connection with one or more of FIGS. 1-4. For example, the electronic device 102 may determine 510 an area (e.g., block) of the semi-dense motion vector map that includes the feature point. The motion vector(s) from the area and/or from the one or more neighboring areas (e.g., blocks) may be utilized to determine the search space(s). For example, the motion vector in the area that includes the feature point may be combined (e.g., added) to the feature point. The search space may include an area (e.g., block corresponding to the semi-dense motion vector map, a neighborhood of pixels, a uniform region, a non-uniform region, a symmetrical region, an asymmetrical region, a box, a square, a rectangle, a circle, an ellipse, a polygon, etc.) that includes the point resulting from the translation of the feature point with the motion vector. One or more neighboring areas (e.g., blocks, windows, etc.) may be optionally utilized as search spaces. It should be noted that each of the one or more search spaces may be the same size and/or shape as the template or may be different size(s) and/or shape(s).

The electronic device 102 may perform 512 a matching operation between the template and the at least one search space. This may be accomplished as described in connection with one or more of FIGS. 1-4.

The electronic device 102 may determine 514 a motion vector corresponding to the feature point based on the matching operation. This may be accomplished as described in connection with one or more of FIGS. 1-4. It should be noted that the method 500 may be performed for multiple feature points (e.g., for a set of feature points). For example, one or more of the functions and/or steps 502, 504, 506, 508 may be performed for a set of feature points.

Figure 6:
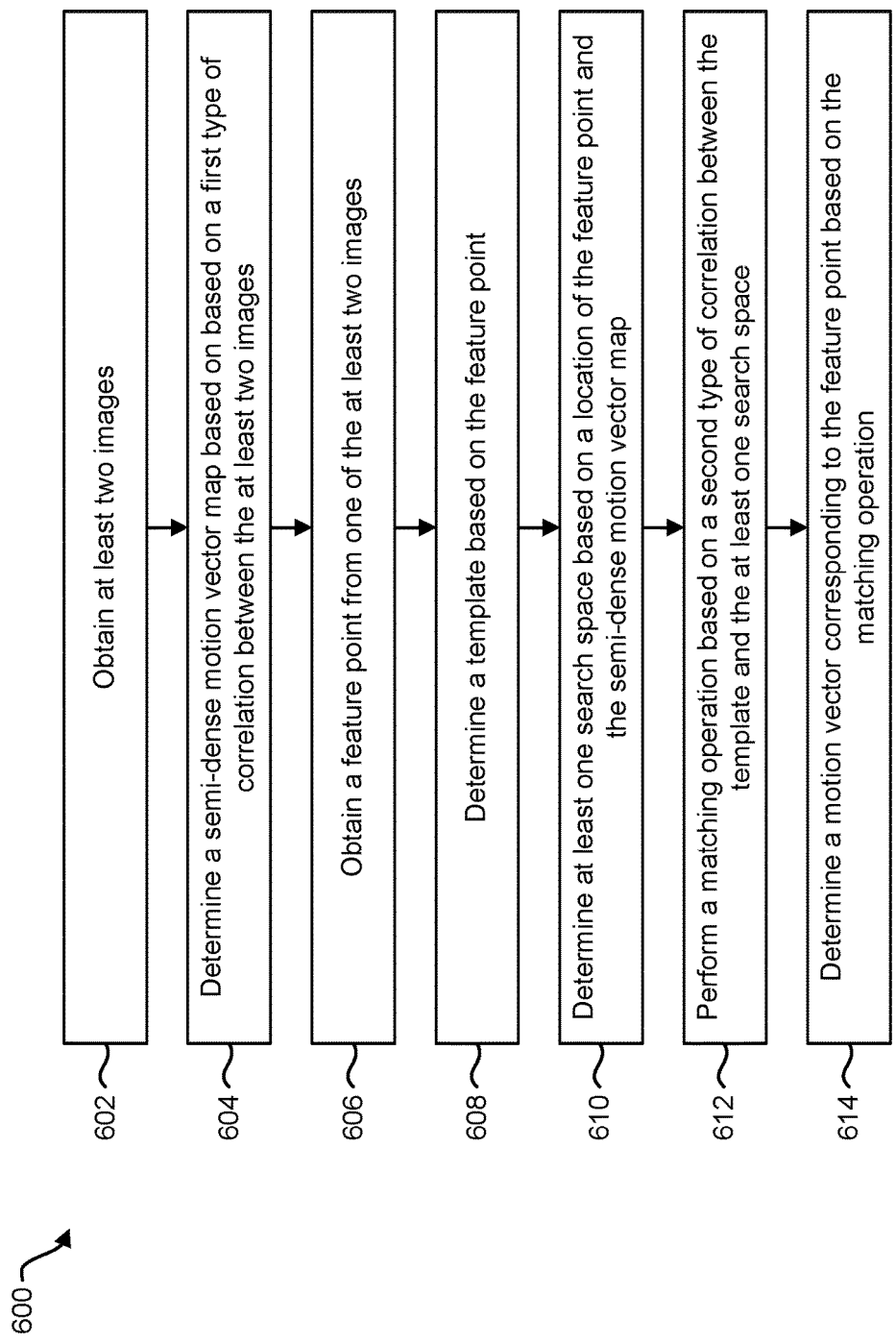
FIG. 6 is a flow diagram illustrating another more specific configuration of a method for determining feature point motion.

FIG. 6 is a flow diagram illustrating another more specific configuration of a method 600 for determining feature point motion. The method 600 may be performed by an electronic device (e.g., the electronic device 102 described in connection with FIG. 1) and/or one or more of the components described in connection with FIG. 4.

The electronic device 102 may obtain 602 at least two images. This may be accomplished as described in connection with one or more of FIGS. 1 and 5.

The electronic device 102 may obtain 604 a semi-dense motion vector map based on a first type of correlation between the at least two images. This may be accomplished as described in connection with one or more of FIGS. 1-5. For example, the electronic device 102 may determine and/or receive a semi-dense motion vector map that is based on a first type of correlation (e.g., SAD). For instance, a motion engine may determine the semi-dense motion vector map between two images utilizing a first type of correlation operation.

The electronic device 102 may obtain 606 a feature point from one of the at least two images (e.g., from a first image). This may be accomplished as described in connection with one or more of FIGS. 1-5.

The electronic device 102 may determine 608 a template based on the feature point. This may be accomplished as described in connection with one or more of FIGS. 1-5.

The electronic device 102 may determine 610 at least one search space based on a location of the feature point and the semi-dense motion vector map. This may be accomplished as described in connection with one or more of FIGS. 1-5.

The electronic device 102 may perform 612 a matching operation based on a second type of correlation between the template and the at least one search space. This may be accomplished as described in connection with one or more of FIGS. 1-5. For example, the electronic device 102 may perform a second type of correlation (e.g., NCC) between the template and the least one search space (at one or multiple locations within each search space, for instance). The first type of correlation utilized to determine 604 the semi-dense motion vector map may be different from the second type of correlation utilized to perform 612 the matching operation. It should be noted that although SAD and NCC are provided as respective examples for the first type of correlation and second type of correlation, other types of correlation may be utilized. In some configurations, the first type of correlation may exhibit higher speed, less complexity, and/or more efficiency in comparison with the second type of correlation.

In some configurations, the first type of correlation may exhibit less accuracy (e.g., less resolution, less certainty, etc.) in comparison with the second type of correlation. For example, the second type of correlation may be a more accurate, more computationally intensive, and/or more complex type of correlation than the first type of correlation. The second type of correlation may be utilized to improve motion vector quality (which may be superior to a motion vector provided by the first type of correlation in hardware, for example). Accordingly, the first type of correlation may be utilized to determine one or more motion vectors that may be approximations or estimates of a feature point motion vector (where the feature point is located relatively near the motion vectors). While these motion vectors may be obtained quickly and/or efficiently, they may not offer high accuracy and/or certainty that they accurately represent a feature point motion vector. Accordingly, the second type of correlation may be utilized to verify that one of the motion vector estimates is a suitable (e.g., the most accurate) representation of a feature point motion vector. Additionally or alternatively, the second type of correlation may be utilized to determine (e.g., refine) the feature point motion vector by offering higher accuracy. While the second type of correlation offers higher accuracy, it may be slower and/or less efficient than the first type of correlation.

In accordance with some configurations of the systems and methods disclosed herein, the semi-dense motion vector map (e.g., the first type of correlation) may be utilized to reduce a search area (e.g., from a whole image to one or more search spaces) for the matching operation (e.g., the second type of correlation). Accordingly, the benefits of a quick (but less accurate) semi-dense motion vector map may be combined with the benefits of a higher accuracy matching operation.

The electronic device 102 may determine 614 a motion vector corresponding to the feature point based on the matching operation. This may be accomplished as described in connection with one or more of FIGS. 1-5. It should be noted that the method 600 may be performed for multiple feature points (e.g., for a set of feature points). For example, one or more of the functions and/or steps 602, 604, 606, 608 may be performed for a set of feature points.

Figure 7:
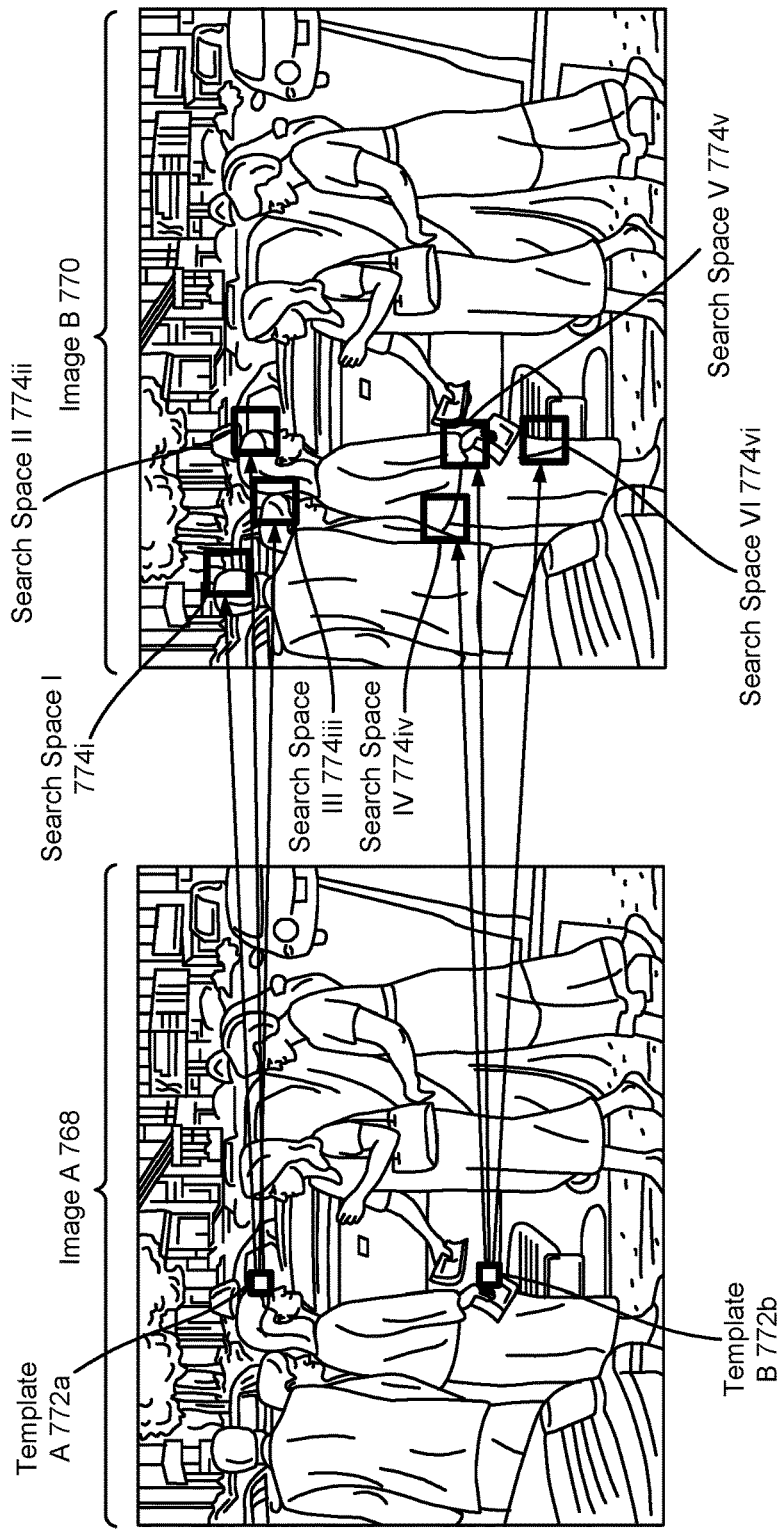
FIG. 7 is a diagram illustrating an example of object tracking in accordance with the systems and methods disclosed herein.

FIG. 7 is a diagram illustrating an example of object tracking in accordance with the systems and methods disclosed herein. In particular, FIG. 7 illustrates image A 768 (e.g., frame N−1) and image B 770 (e.g., frame N). In image A 768, an electronic device (e.g., electronic device 102) may utilize a feature point (e.g., corner) detector to find the most significant feature points (e.g., corners) in moving blobs or detected pedestrians. The electronic device may utilize the feature points to determine templates A-B 772a-b. While only templates A-B 772a-b are illustrated in FIG. 7, it should be noted that more or fewer feature points and/or templates may be utilized. The electronic device may determine a semi-dense motion vector map between image A 768 and image B 770.

The electronic device may utilize the semi-dense motion vector map to determine (e.g., define) search spaces I-VI 774i-vi in image B 770 (e.g., the current frame). Search spaces I-VI 774i-vi may be defined using motion vectors, feature points and/or object movement history, etc. As illustrated in FIG. 7, search spaces I-III 774i-iii may correspond to a first feature point (and three motion vectors from the semi-dense motion vector map) and search spaces IV-VI 774iv-vi may correspond to a second feature point (and three other motion vectors from the semi-dense motion vector map).

The electronic device may utilize correlation to match respective templates A-B 772a-b (e.g., feature point templates, corner templates, etc. 0 to search spaces I-VI 774i-vi. Each feature point (e.g., corner) may match to multiple search areas. This may be used to validate and/or refine the motion vectors. This may help handling situations like objects crossing each other, occlusion, inaccurate motion vectors, etc.

Figure 8:
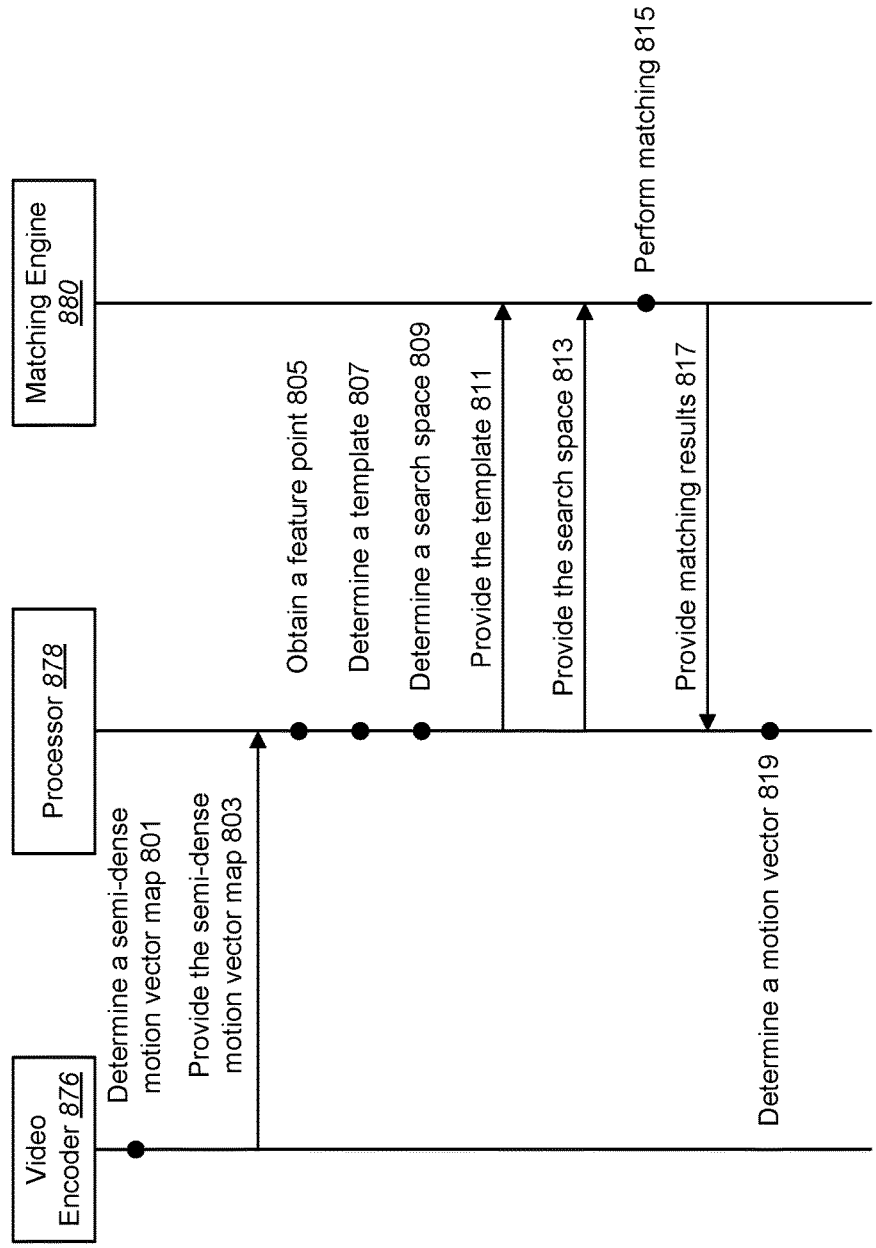
FIG. 8 is a thread diagram illustrating one example of communication between a video encoder, a processor, and a matching engine in accordance with some configurations of the systems and methods disclosed herein.

FIG. 8 is a thread diagram illustrating one example of communication between a video encoder 876, a processor 878, and a matching engine 880 (e.g., a correlation engine) in accordance with some configurations of the systems and methods disclosed herein. The video encoder 876 may be an example of and/or may include the motion engine 116 described in connection with FIG. 1. The processor 878 may be an example of the processor 112 described in connection with FIG. 1. The matching engine 880 may be an example of the matching engine 128 described in connection with FIG. 1.

The video encoder 876 may determine 801 a semi-dense motion vector map. This may be accomplished as described in connection with one or more of FIGS. 1-7. The video encoder 876 may provide 803 the semi-dense motion vector map to the processor 878. For example, the video encoder 876 may send the semi-dense motion vector map to the processor 878 via a bus, wire, or wireless link. The processor 878 may receive the semi-dense motion vector map.

The processor 878 may obtain 805 a feature point. This may be accomplished as described in connection with one or more of FIGS. 1-7. The processor 878 may determine 807 a template (based on the feature point). This may be accomplished as described in connection with one or more of FIGS. 1-7. The processor 878 may determine 809 a search space. The search space may be determined based on a location of the feature point and the semi-dense motion vector map. This may be accomplished as described in connection with one or more of FIGS. 1-7.

The processor 878 may provide 811 the template to the matching engine 880. For example, the processor 878 may send the semi-dense motion vector map to the matching engine 880 via a bus, wire, or wireless link. The matching engine 880 may receive the semi-dense motion vector map. The processor 878 may provide 813 the search space to the matching engine 880. For example, the processor 878 may send the search space to the matching engine 880 via a bus, wire, or wireless link. The matching engine 880 may receive the search space.

The matching engine 880 may perform 815 matching (e.g., compute one or more correlations). For example, the matching engine 880 may perform 815 a matching operation between the template and the at least one search space. This may be accomplished as described in connection with one or more of FIGS. 1-7. The matching engine 880 may provide 817 the matching results (e.g., matching scores) to the processor 878. For example, the matching engine 880 may send the search space to the processor 878 via a bus, wire, or wireless link. The processor 878 may receive the search space.

The processor 878 may determine 819 a motion vector. This may be accomplished as described in connection with one or more of FIGS. 1-7. It should be noted that one or more of the functions described in connection with FIG. 8 may be performed for multiple feature points, multiple semi-dense motion vector maps, multiple templates, and/or multiple search spaces, etc.

Figure 9:
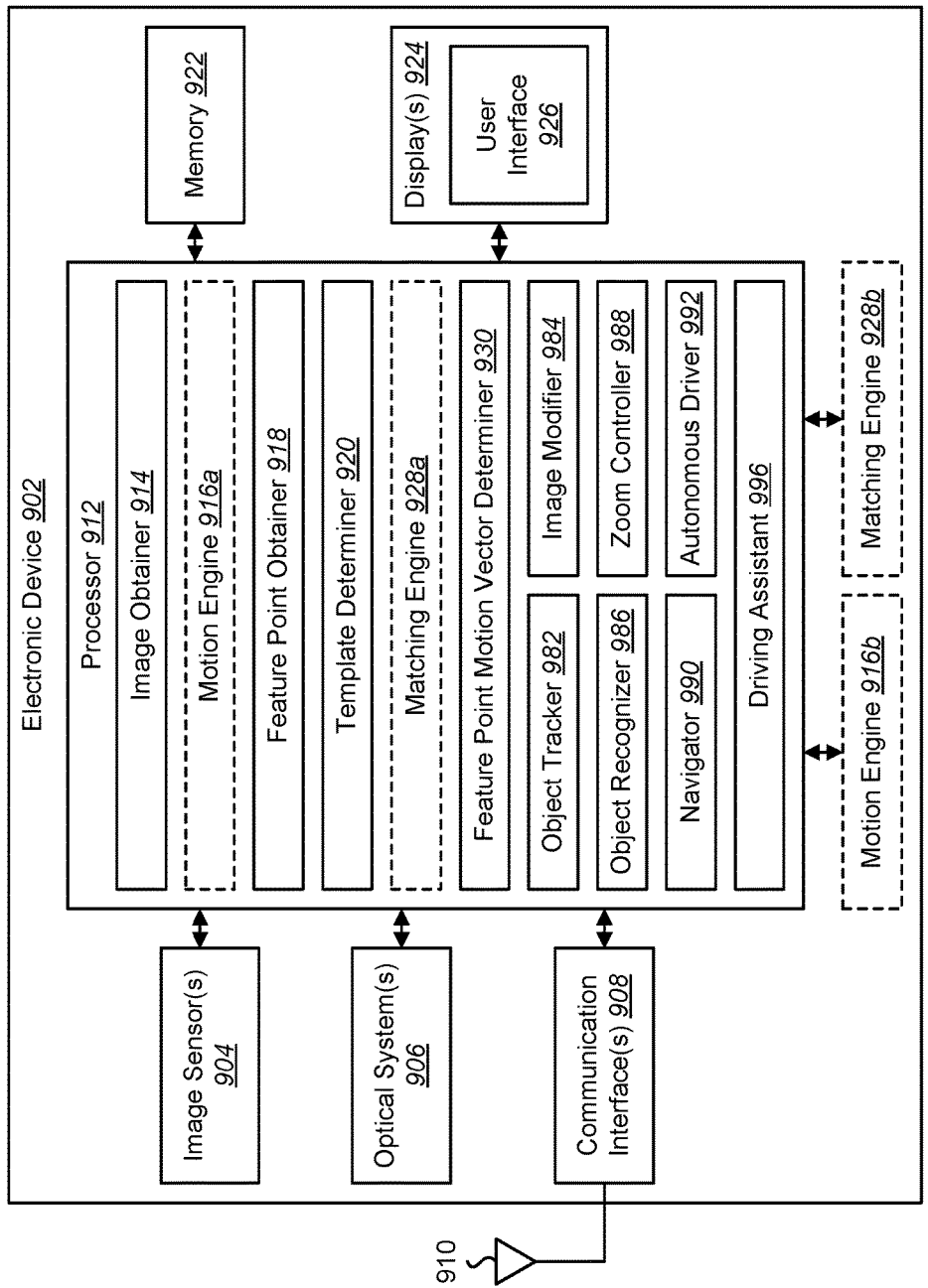
FIG. 9 is a block diagram illustrating a more specific example of an electronic device in which systems and methods for determining a feature point motion vector may be implemented.

FIG. 9 is a block diagram illustrating a more specific example of an electronic device 902 in which systems and methods for determining a feature point motion vector may be implemented. The electronic device 902 described in connection with FIG. 9 may be an example of the electronic device 102 described in connection with FIG. 1 and/or may be configured similarly to the electronic device 102 described in connection with FIG. 1 in some configurations. The electronic device 902 may include one or more components or elements. One or more of the components or elements may be implemented in hardware (e.g., circuitry) or a combination of hardware and software (e.g., a processor with instructions). One or more of the components or elements described in connection with FIG. 9 may be examples of corresponding components or elements described in connection with FIG. 1.

In some configurations, the electronic device 902 may perform one or more of the functions, procedures, methods, steps, etc., described in connection with one or more of FIGS. 1-10. Additionally or alternatively, the electronic device 902 may include one or more of the structures described in connection with one or more of FIGS. 1-10.

In some configurations, the electronic device 902 may include a processor 912, a memory 922, one or more displays 924, one or more image sensors 904, one or more optical systems 906, one or more communication interfaces 908, and/or one or more antennas 910. The processor 912 may be coupled to (e.g., in electronic communication with) the memory 922, display 924, image sensor(s) 904, optical system(s) 906, and/or communication interface 908. The processor 912, image sensor(s) 904, optical system(s) 906, communication interface(s) 908, antenna(s) 910, memory 922, and/or display(s) 924 may operate similarly to corresponding elements described in connection with FIG. 1 and/or may perform one or more of the functions described in connection with corresponding elements described in connection with FIG. 1. It should be noted that one or more of the elements of the electronic device 902 described in connection with FIG. 9 (e.g., image sensor(s) 904, optical system(s) 906, communication interface 908, display(s) 924, etc.) may be optional and/or may not be included (e.g., implemented) in the electronic device 902 in some configurations.

The processor 912 may be configured to implement one or more of the methods disclosed herein. The processor 912 may include and/or implement an image obtainer 914, a motion engine 916a, a feature point obtainer 918, a template determiner 920, a matcher 928a, a feature point motion vector determiner 930, an object tracker 982, an image modifier 984, an object recognizer 986, an automatic zoom controller 988, a navigator 990, an autonomous driver 992, and/or a driving assistant 996 in some configurations. One or more of the image obtainer 914, motion engine 916a, feature point obtainer 918, template determiner 920, matcher 928a, and/or feature point motion vector determiner 930 may be examples of corresponding components or elements described in connection with FIG. 1 and/or may perform one or more of the functions described in connection with corresponding elements described in connection with FIG. 1. It should be noted that one or more of the elements of the processor 912 described in connection with FIG. 9 (e.g., an object tracker 982, an image modifier 984, an object recognizer 986, an automatic zoom controller 988, a navigator 990, an autonomous driver 992, and/or a driving assistant 996, etc.) may be optional and/or may not be included (e.g., implemented) in the electronic device 902 in some configurations. In some configurations, the electronic device 902 may optionally include a separate motion engine 916a and/or a separate matching engine 928b as described in connection with FIG. 1.

The memory 922 may store instructions and/or data. Examples of instructions and/or data that may be stored by the memory 922 may include image data, image obtainer 914 instructions, template determiner 920 instructions, motion engine 916 instructions, feature point obtainer 918 instructions, matching engine 928 instructions, object tracker 982 instructions, image modifier 984 instructions, object recognizer 986 instructions, automatic zoom controller 988 instructions, navigator 990 instructions, autonomous driver 992 instructions, and/or driving assistant 996 instructions, etc.

In some configurations, the electronic device 902 may present a user interface 926 on the display 924. For example, the user interface 926 may enable a user to interact with the electronic device 902.

In some configurations, the electronic device 902 may generate a region of interest (ROI) (e.g., bounding box) based on the feature point motion vector(s) provide by the feature point motion vector determiner 930. For example, the electronic device 902 may generate an ROI that includes all or a portion updated feature points.

In some configurations, the processor 912 may include and/or implement an object tracker 982. The object tracker 982 may track an object from image to image (e.g., frame-to-frame) based on the motion vector(s) and/or the ROI. For example, the electronic device 102 may utilize the updated feature points and/or a region including the updated feature points to track a corresponding object in an image (e.g., a second image). For instance, the object tracker 982 may utilize the motion vector(s) to track the object in a subsequent frame. In some approaches, the object tracker 982 may track motion of image data with feature points from frame to frame and/or may determine a location, size or frame of the target object based on movement of an electronic device 902 (e.g., if the camera is moving) or movements of objects from frame to frame.

In some configurations, the processor 912 may include and/or implement an image modifier 984. The image modifier 984 may modify an image based on the motion vector(s). For example, the image modifier 984 may remove an object indicated by the motion vectors by replacing the image data corresponding to the object (and/or the ROI) with substitute image data (e.g., copied image data from the image such as image data near the object (e.g., ROI) and/or predetermined image data (e.g., image data for covering and/or censoring the object)). In another example, the image modifier 984 may modify the appearance of the object. The motion vectors may indicate locations to apply modifications from frame-to-frame. For instance, the image modifier 984 may remove red eye corresponding to the object, may suppress image noise corresponding to the object, may enhance the appearance of the object (e.g., remove blemishes, saturate color, etc.), and/or may add an effect to the object (e.g., add the appearance of makeup, change colors, add a novelty effect, etc.). In another example, the image modifier 984 may clone the object corresponding to the feature points by copying the image data to another location in the image or a separate image. Other modifications are possible.

In some configurations, the processor 912 may include and/or implement an object recognizer 986. The object recognizer 986 may perform object recognition based on the motion vector(s). For example, the object recognizer 986 may compare the image data (e.g., object) indicated by the feature points and/or motion vectors to a database of one or more known objects. If the object matches one or more of the known objects, the object recognizer 986 may indicate a match and/or may perform another operation based on the match (e.g., retrieve information (e.g., name, identifier, contact information, etc.) corresponding to the object, tag the object in the image, etc.). In some configurations, the object recognizer 986 may add recognition information to a database corresponding to the object.

In some configurations, the processor 912 may include and/or implement an automatic zoom controller 988. The automatic zoom controller 988 may perform automatic zoom based on the motion vector(s) and/or the ROI. For example, the automatic zoom controller 988 may enlarge the appearance of an object with tracked feature points. For instance, the automatic zoom controller 988 may control location, motion, motion response speed, size, and/or zoom level of a zoom region. A zoom region may be a region within the full field of view of the image sensor(s) 904 and/or a remote camera. For example, the zoom region may be a sub-region of the full field of view (and may be relative to the full field of view, for example). The image content within the zoom region may be magnified (e.g., digitally scaled and/or enhanced, etc.) in order to enlarge the image content. In some configurations, performing automatic zoom may be based on the motion vector(s) and/or the ROI. For example, the zooming effect may be automatically changed based on the movement, location, and/or size of the object as indicated by the motion vector(s). Additionally or alternatively, the automatic zoom controller 988 may adjust a zoom level from frame-to-frame based on object motion indicated by the motion vector(s). For example, the zoom (e.g., zoom factor, magnification, etc.) may be based on feature point motion.

The processor 912 may provide the zoom information (e.g., zoomed region information, the cropped zoom region, etc.). For example, the processor 912 may provide the zoom region to the display(s) 924 for presentation. Additionally or alternatively, the processor 912 may send the zoom region to another device (via the communication interface 908, for instance). In some configurations, the zoom region (e.g., the cropped zoom region) may be presented. The zoom region may occupy only a portion (e.g., picture-in-picture (PiP), picture and picture, etc.) of a view of the display 924 in some approaches. For example, the zoom region may be presented on top of the full field of view. In other approaches, the zoom region may occupy the entire view. For example, the full field of view may not be shown when the zoom region is zoomed in.

The processor 912 may include and/or implement a navigator 990 in some configurations. For example, the navigator 990 may utilize the motion vectors for performing navigation. For instance, the navigator 990 may utilize the updated feature points and/or a region including the updated feature points to determine the location of an object and/or to avoid colliding with the object. For example, the motion vector(s) and/or updated feature point(s) may indicate the relative motion between an object in a scene and an electronic device (e.g., a drone, a robot, a vehicle, an aircraft, etc.). Accordingly, the navigator 990 (e.g., drone, robot, vehicle, aircraft, etc.) may control movement (e.g., wheel motion, steering, drive train, braking, crawler tracks, rotors, thrust, etc.) to navigate around one or more objects (e.g., obstructions) and/or to avoid colliding with an object (e.g., obstruction).

In some configurations, processor 912 may include and/or implement an autonomous driver 992 and/or a driving assistant 996. The autonomous driver 992 and/or a driving assistant 996 may utilize the motion vectors for performing autonomous and/or assisted driving. For instance, the autonomous driver 992 and/or a driving assistant 996 may utilize the updated feature points and/or a region including the updated feature points to determine the location of an object and/or to avoid colliding with the object. For example, the motion vector(s) and/or updated feature point(s) may indicate the relative motion between an object in a scene and an electronic device (e.g., a vehicle). Accordingly, the autonomous driver 992 and/or a driving assistant 996 may control movement (e.g., wheel motion, steering, drive train, braking, etc.) to navigate around one or more objects (e.g., obstructions) and/or to avoid colliding with an object (e.g., obstruction). For instance, a vehicle may autonomously drive while avoiding colliding with objects (e.g., pedestrians, other vehicles, debris, etc.) indicated by the motion vector(s). In another example, a vehicle may assist a driver of a vehicle by initiating emergency braking and/or maneuvers to avoid a collision and/or to reduce collision impact.

It should be noted that one or more other modules and/or functions may be implemented in some configurations. For example, the processor 912 may include an autofocus controller that may focus image content based on the motion vector(s). It should be noted that one or more of the elements or components of the electronic device 902 may be combined and/or divided.

Figure 10:
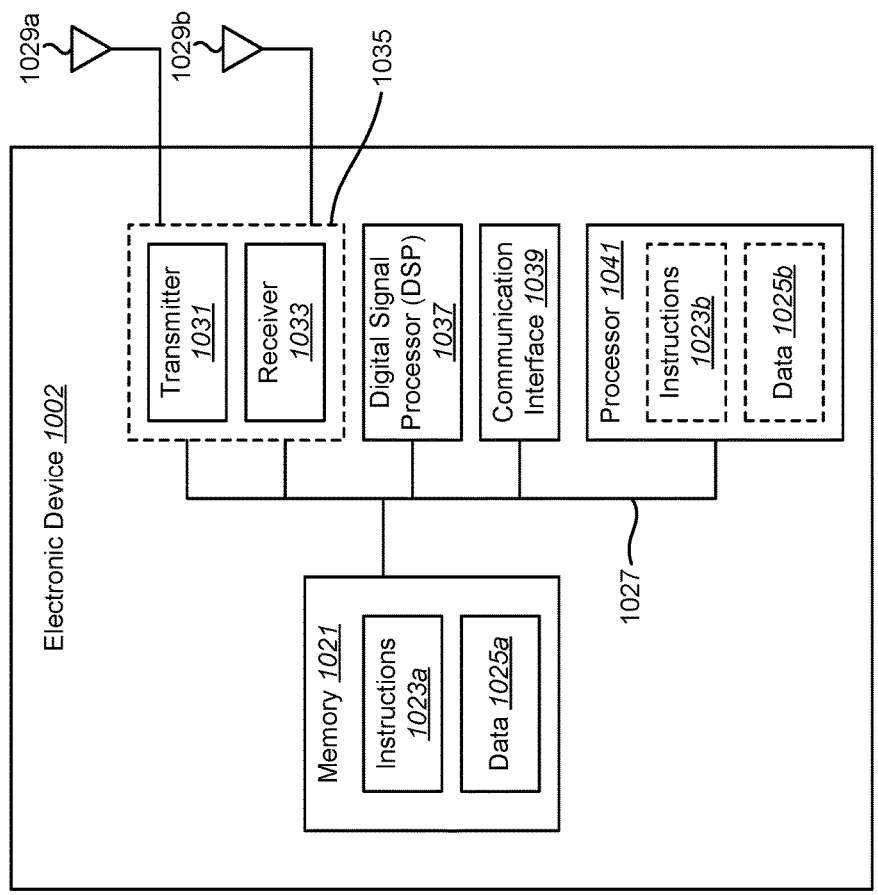
FIG. 10 illustrates certain components that may be included within an electronic device configured to implement various configurations of the systems and methods disclosed herein

FIG. 10 illustrates certain components that may be included within an electronic device 1002 configured to implement various configurations of the systems and methods disclosed herein. For example, the electronic device 1002 may be implemented to determine feature vector motion in accordance with one or more configurations of the systems and methods disclosed herein. The electronic device 1002 may be and/or may be included in an access terminal, a mobile station, a user equipment (UE), a smartphone, a digital camera, a video camera, a tablet device, a laptop computer, a vehicle, a drone, an augmented reality device, a virtual reality device, an aircraft, an appliance, a television, etc. The electronic device 1002 may be implemented in accordance with one or more of the electronic devices 102, 902 and/or in accordance with one or more the components described herein (e.g., components described in connection with one or more of FIGS. 1, 4, and 8-9).

The electronic device 1002 includes a processor 1041. The processor 1041 may be a general purpose single- or multi-chip microprocessor (e.g., an ARM), a special purpose microprocessor (e.g., a digital signal processor (DSP)), a microcontroller, a programmable gate array, etc. The processor 1041 may be referred to as a central processing unit (CPU). Although just a single processor 1041 is shown in the electronic device 1002, in an alternative configuration, a combination of processors (e.g., an ARM and DSP) could be implemented.

The electronic device 1002 also includes memory 1021. The memory 1021 may be any electronic component capable of storing electronic information. The memory 1021 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1025*a* and instructions 1023*a* may be stored in the memory 1021. The instructions 1023*a* may be executable by the processor 1041 to implement one or more of the methods 200, 500, 600 described herein. Executing the instructions 1023*a* may involve the use of the data 1025*a* that is stored in the memory 1021. When the processor 1041 executes the instructions 1023, various portions of the instructions 1023*b* may be loaded onto the processor 1041, and various pieces of data 1025*b* may be loaded onto the processor 1041.

The electronic device 1002 may also include a transmitter 1031 and a receiver 1033 to allow transmission and reception of signals to and from the electronic device 1002. The transmitter 1031 and receiver 1033 may be collectively referred to as a transceiver 1035. One or more antennas 1029*a-b* may be electrically coupled to the transceiver 1035. The electronic device 1002 may also include (not shown) multiple transmitters, multiple receivers, multiple transceivers and/or additional antennas.

The electronic device 1002 may include a digital signal processor (DSP) 1037. The electronic device 1002 may also include a communication interface 1039. The communication interface 1039 may allow and/or enable one or more kinds of input and/or output. For example, the communication interface 1039 may include one or more ports and/or communication devices for linking other devices to the electronic device 1002. In some configurations, the communication interface 1039 may include the transmitter 1031, the receiver 1033, or both (e.g., the transceiver 1035). Additionally or alternatively, the communication interface 1039 may include one or more other interfaces (e.g., touchscreen, keypad, keyboard, microphone, camera, etc.). For example, the communication interface 1039 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1027.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
obtaining a motion vector map based on at least two images, the motion vector map having fewer motion vectors than a number of pixels in each of the at least two images;
obtaining a feature point from one of the at least two images, wherein the feature point is a corner or keypoint;
determining at least one search space based on a selected motion vector corresponding to an area of the motion vector map in response to determining that the feature point is included in the area, wherein a center point of the area corresponding to the selected motion vector is different from the feature point and the selected motion vector is applied to the feature point to determine the at least one search space;
performing a matching operation between a template associated with the feature point and the at least one search space based on the motion vector map; and
determining a motion vector corresponding to the feature point based on the matching operation.

2. The method of claim 1, further comprising:
determining the template based on the feature point, wherein the template comprises a set of pixels including the feature point.

3. The method of claim 1, wherein the motion vector map is determined by video encoder hardware.

4. The method of claim 1, wherein the motion vector map is determined based on a first type of correlation, and wherein the motion vector corresponding to the feature point is determined based on a second type of correlation that is different from the first type of correlation.

5. The method of claim 4, wherein the second type of correlation is a more accurate and computationally intensive type of correlation than the first type of correlation.

6. The method of claim 4, wherein the first type of correlation is a sum of absolution differences (SAD) and the second type of correlation is a normalized cross correlation (NCC).

7. The method of claim 1, wherein the matching operation is performed by correlation engine circuitry and determining the motion vector is performed by a processor that is separate from the correlation engine circuitry.

8. The method of claim 1, further comprising tracking an object based on the motion vector.

9. An electronic device, comprising:
a motion engine, implemented in at least one of one or more hardware units, configured to obtain a motion vector map based on at least two images, the motion vector map having fewer motion vectors than a number of pixels in each of the at least two images;
a feature point obtainer, implemented in at least one of the one or more hardware units, configured to obtain a feature point from one of the at least two images, wherein the feature point is a corner or keypoint;
a search space determiner, implemented in at least one of the one or more hardware units, configured to determine at least one search space based on a selected motion vector corresponding to an area of the motion vector map in response to determining that the feature point is included in the area, wherein a center point of the area corresponding to the selected motion vector is different from the feature point and the selected motion vector is applied to the feature point to determine the at least one search space;
a matching engine, implemented in at least one of the one or more hardware units, configured to perform a matching operation between a template associated with the feature point and the at least one search space based on the motion vector map; and
a feature point motion vector determiner, implemented in at least one of the one or more hardware units, configured to determine a motion vector corresponding to the feature point based on the matching operation.

10. The electronic device of claim 9, further comprising:
a template determiner, implemented in at least one of the one or more hardware units, configured to determine the template based on the feature point, wherein the template comprises a set of pixels including the feature point.

11. The electronic device of claim 9, wherein the motion vector map is determined by the motion engine in video encoder hardware.

12. The electronic device of claim 9, wherein the motion vector map is determined based on a first type of correlation, and wherein the motion vector corresponding to the feature point is determined based on a second type of correlation that is different from the first type of correlation.

13. The electronic device of claim 12, wherein the second type of correlation is a more accurate and computationally intensive type of correlation than the first type of correlation.

14. The electronic device of claim 12, wherein the first type of correlation is a sum of absolution differences (SAD) and the second type of correlation is a normalized cross correlation (NCC).

15. The electronic device of claim 9, wherein the matching operation is performed by correlation engine circuitry and determining the motion vector is performed by a processor that is separate from the correlation engine circuitry.

16. The electronic device of claim 9, further comprising an object tracker, implemented in at least one of the one or more hardware units, configured to track an object based on the motion vector.

17. An apparatus, comprising:
means for obtaining a motion vector map based on at least two images, the motion vector map having fewer motion vectors than a number of pixels in each of the at least two images;
means for obtaining a feature point from one of the at least two images, wherein the feature point is a corner or keypoint;
means for determining at least one search space based on a selected motion vector corresponding to an area of the motion vector map in response to determining that the feature point is included in the area, wherein a center point of the area corresponding to the selected motion vector is different from the feature point and the selected motion vector is applied to the feature point to determine the at least one search space;

means for performing a matching operation between a template associated with the feature point and the at least one search space based on the motion vector map; and means for determining a motion vector corresponding to the feature point based on the matching operation.

18. The apparatus of claim 17, further comprising:
means for determining the template based on the feature point, wherein the template comprises a set of pixels including the feature point.

19. The apparatus of claim 17, wherein the motion vector map is determined by video encoder hardware.

20. The apparatus of claim 17, wherein the motion vector map is determined based on a first type of correlation, and wherein the motion vector corresponding to the feature point is determined based on a second type of correlation that is different from the first type of correlation.

21. The apparatus of claim 20, wherein the second type of correlation is a more accurate and computationally intensive type of correlation than the first type of correlation.

22. The apparatus of claim 20, wherein the first type of correlation is a sum of absolution differences (SAD) and the second type of correlation is a normalized cross correlation (NCC).

23. The apparatus of claim 17, wherein the means for performing a matching operation is a correlation engine and the means for determining the motion vector is a processor that is separate from the correlation engine.

24. A computer-program product, comprising a non-transitory computer-readable medium having instructions thereon, the instructions comprising:
code for causing an electronic device to obtain a motion vector map based on at least two images, the motion vector map having fewer motion vectors than a number of pixels in each of the at least two images;
code for causing the electronic device to obtain a feature point from one of the at least two images, wherein the feature point is a corner or keypoint;
code for causing the electronic device to determine at least one search space based on a selected motion vector corresponding to an area of the motion vector map in response to determining that the feature point is included in the area, wherein a center point of the area corresponding to the selected motion vector is different from the feature point and the selected motion vector is applied to the feature point to determine the at least one search space;
code for causing the electronic device to perform a matching operation between a template associated with the feature point and the at least one search space based on the motion vector map; and
code for causing the electronic device to determine a motion vector corresponding to the feature point based on the matching operation.

25. The computer-program product of claim 24, further comprising:
code for causing the electronic device to determine the template based on the feature point, wherein the template comprises a set of pixels including the feature point.

26. The computer-program product of claim 24, wherein the motion vector map is determined by video encoder hardware.

27. The computer-program product of claim 24, wherein the motion vector map is determined based on a first type of correlation, and wherein the motion vector corresponding to the feature point is determined based on a second type of correlation that is different from the first type of correlation.

28. The computer-program product of claim 27, wherein the second type of correlation is a more accurate and computationally intensive type of correlation than the first type of correlation.

29. The computer-program product of claim 27, wherein the first type of correlation is a sum of absolution differences (SAD) and the second type of correlation is a normalized cross correlation (NCC).

30. The computer-program product of claim 24, wherein the matching operation is performed by correlation engine circuitry and determining the motion vector is performed by a processor that is separate from the correlation engine circuitry.

* * * * *